United States Patent
Penning

(10) Patent No.: US 7,941,677 B2
(45) Date of Patent: May 10, 2011

(54) APPARATUS AND METHODS FOR MANAGING POWER DISTRIBUTION OVER ETHERNET

(75) Inventor: Randall J. Penning, Middletown, NJ (US)

(73) Assignee: Avaya Inc., Basking Ridge, NJ (US)

( * ) Notice: Subject to any disclaimer, the term of this patent is extended or adjusted under 35 U.S.C. 154(b) by 944 days.

(21) Appl. No.: 11/649,913

(22) Filed: Jan. 5, 2007

(65) Prior Publication Data

US 2008/0168283 A1    Jul. 10, 2008

(51) Int. Cl.
*G06F 1/00* (2006.01)
(52) U.S. Cl. ........ 713/300; 700/286; 700/295; 700/297; 455/402; 361/731
(58) Field of Classification Search .................. 713/300; 700/286, 295, 297; 455/402; 361/731
See application file for complete search history.

(56) References Cited

U.S. PATENT DOCUMENTS

| 6,473,608 | B1 | 10/2002 | Lehr |
| 7,203,849 | B2 | 4/2007 | Dove |
| 7,337,336 | B2 * | 2/2008 | Ferentz et al. ............. 713/300 |
| 2005/0080516 | A1 | 4/2005 | Pincu |
| 2009/0073957 | A1 | 3/2009 | Newland et al. |

FOREIGN PATENT DOCUMENTS

| WO | WO 2005/071885 A | 8/2005 |
| WO | 2005/109154 A2 | 11/2005 |
| WO | WO 2005/109154 A | 11/2005 |

OTHER PUBLICATIONS

Apr. 15, 2010, Office Action from U.S. Appl. No. 11/541,788.
Sep. 29, 2009, Office Action from U.S. Appl. No. 11/541,788.
Mar. 12, 2010, Office Action from corresponding Canadian Application No. 2,615,570.

* cited by examiner

*Primary Examiner* — Abdelmoniem Elamin
(74) *Attorney, Agent, or Firm* — Muncy, Geissler, Olds & Lowe, PLLC

(57) ABSTRACT

A network apparatus and method for managing power supplied to a network device. A plurality of power inputs to the network device are scanned to ascertain if a power signal is present and to identify an active power source. Available power is determined from the active power source and required power for the network device and any operatively connected auxiliary devices is also determined. The required power is compared to available power to determine if available power is sufficient to power the network device. An operation of the network device is controlled based upon the active power source and/or if available power is insufficient to power the network device.

38 Claims, 11 Drawing Sheets

APPARATUS AND METHODS FOR MANAGING POWER DISTRIBUTION OVER ETHERNET

BACKGROUND OF THE INVENTION

1. Field of the Invention

Embodiments of the invention generally relate to the power management of networking devices, and more particularly, networked devices with variable power consumption and/or multiple power supplies. Additional embodiments are directed to networked devices, such as Voice over Internet Protocol (VoIP) telephones, which permit the connection of auxiliary devices, such as peripheral devices, modules, and/or adapters to utilize Power over Ethernet (PoE) and/or data exchange through a network connection provided to the networked device.

2. Description of the Background Art

The IEEE Power over Ethernet (PoE) standard 802.3af, the entirety of which is hereby incorporated by reference, may increase the flexibility and capability of existing Ethernet networks by providing power over the same connection media which is used to exchange data. Since PoE may provide power in a reliable manner over the same network connection as data, e.g., such as through Cat 5 or Cat 6 Ethernet cables, PoE can improve the flexibility of the placement of network devices. The use of PoE is particularly useful for powering various network devices in some applications, such as, for example, Voice over Internet Protocol (VoIP) telephones. Additionally, when the PoE source is supplemented with an Uninterruptible Power Supply (UPS) as a power backup, PoE may be able to permit a network device to function during an AC power outage, which may be especially useful for VoIP telephones in emergency situations.

Various network devices, such as telephones, e.g., computer-to-computer or "soft" phones, analog phones connected to a network through an analog telephony adapter (ATA), and/or internet protocol (IP) telephones, may also be provided with peripheral ports, such as universal serial bus (USB) ports, supporting a variety of peripheral devices. For example, a peripheral device, such as a cellular phone with a USB plug, may be connected to a network device to draw power or data through the peripheral port of the network device, such as through the USB port of an IP telephone. The connected peripheral device may be recharged or powered through the peripheral port through the same power source used by the network device, e.g., through PoE, UPS, and/or through an AC/DC wall adapter powering the network device.

SUMMARY OF THE EMBODIMENTS

In one general aspect, a method for managing power supplied to a network device includes scanning a plurality of power inputs to the network device to ascertain if a power signal is present and to identify an active power source. Available power is determined from the active power source and required power for the network device and any operatively connected auxiliary devices is also determined. Required power is compared to available power to determine if available power is sufficient to power the network device. An operation of the network device is controlled based upon the active power source and/or if available power is insufficient to power the network device.

Implementations of this aspect may include one or more of the following features. For example, a user may be prompted to remove a connected auxiliary device to lower required power. A user may be prompted to source power from a different power source if required power is greater than available power. A power supply from the network device may be limited to one or more auxiliary devices operatively connected to the network device.

The active power source may be switched to an alternative power source. The active power source may be a Power over Ethernet (PoE) power source. The alternative power source may be a Power over Ethernet (PoE) power source with an IEEE class different from the active power source. The alternative power source may be an auxiliary power source provided by a battery or a power supply which converts AC power into DC power. The alternative power source may be controlled by a switch which provides power in conjunction with a data signal.

The power supply from the network device to a USB port of the network device may be limited if available power is insufficient to provide required power. Determining required power for the network device may be based on a PoE class signature for the network device. Determining required power for the network device may include assigning a predetermined power requirement for any operatively connected auxiliary devices. Determining required power for the network device may include measuring a power requirement for any operatively connected auxiliary devices.

In another general aspect, a computer-readable medium includes computer-executable instructions contained therein for performing a power management method for a network device. The method which is performed includes scanning a plurality of power inputs to the network device, to ascertain if a power signal is present and to identify an active power source. Available power is determined from the active power source and required power for the network device and any operatively connected auxiliary devices is also determined. Required power is compared to available power to determine if available power is sufficient to power the network device, and an operation of the network device is controlled based upon the active power source and/or if available power is insufficient to power the network device.

In another general aspect, a network apparatus having access to multiple power sources includes at least one sensor operatively coupled to a plurality of power inputs, an auxiliary device connection, and a process controller. The process controller is configured to scan the power inputs to ascertain if a power signal is present and to identify an active power source, to determine available power from the active power source, to determine required power for the network device and any operatively connected auxiliary devices, to compare required power to available power to determine if available power is sufficient to power the network device, and to control an operation of the network device based upon the active power source and/or if available power is insufficient to power the network device.

In another general aspect, a network apparatus includes a power detection device configured to sense a first power signal from an independent power supply and to sense a second power signal through a network connection, wherein the network connection supports both data exchange with, and power supply to, the network apparatus. The network apparatus also includes a process controller configured to determine an active power source based on either the first power signal or the second power signal, and to control an operation of an auxiliary device operatively connected to the network apparatus based upon the active power source.

Implementations of this aspect may include one or more of the following features. For example, the process controller may be configured to control a supply of power to the auxiliary device operatively connected to the network apparatus based upon the active power source. The process controller may be configured to determine if total available power for the network apparatus from the active power source is greater than or equal to total required power for the network apparatus and the auxiliary device. The process controller may be configured to limit the supply of power to the auxiliary device if total available power is less than total required power.

The network apparatus may include a USB port, wherein the process controller is configured to control the supply of power to the auxiliary device through the USB port. The network apparatus may include an auxiliary device connection, wherein the auxiliary device is a network module, a network adapter, or a peripheral device, operatively connected and capable of receiving power through the auxiliary device connection. The power detection device may be configured to sense a power signal between the network apparatus and the auxiliary device operatively connected through the auxiliary device connection. The power detection device may be configured to determine a power requirement for the auxiliary device based on the power signal between the network apparatus and the auxiliary device, and the process controller may be configured to determine the total required power for the network apparatus based on the power requirement for the auxiliary device.

The network apparatus may be a Voice over Internet Protocol (VoIP) phone. The network apparatus may be a powered network device configured to receive Power over Ethernet (PoE) through the network connection. The network apparatus may be a Voice over Internet Protocol (VoIP) telephone, a camera, a wireless access point, and/or a remote telemetry data collection device. The network apparatus may be configured to be powered in a Power over Ethernet (PoE) configuration, including endspan and midspan configurations, and to provide a PoE power signature to a remote data distribution device. The process controller may be configured to provide a power signature for the network device to an endspan or midspan remote data distribution device, the power signature being selectable by the user of the network apparatus.

In another general aspect, a Voice over Internet Protocol (VoIP) telephone includes an independent power supply connection configured to provide a first power signal, a network connection, wherein the network apparatus exchanges data with, and receives a second power signal through the network connection, an auxiliary device connection, a power detection device configured to sense the first power signal from the independent power supply connection, to sense the second power signal through the network connection, and to sense an auxiliary device operatively connected through the auxiliary device connection. The VoIP telephone also includes a process controller configured to determine an active power source based on sensing either the first power signal or the second power signal, to determine a total power requirement for the network apparatus, and to control an operation of the VoIP telephone based upon the active power source and the total power requirement.

Implementations of this aspect may include one or more of the following features. For example, the process controller may be configured to control a supply of power to the auxiliary device based on the active power source. The power detection device may be configured to sense a power signal between the network apparatus and the auxiliary device operatively connected through the auxiliary device connection. The power detection device may be configured to determine a power requirement for the auxiliary device based on the power signal between the network apparatus and the auxiliary device, and the process controller is configured to determine the total power requirement for the network apparatus based on the power requirement for the auxiliary device. The auxiliary device connection may be a USB port, and the process controller may be configured to control a power supply to the USB port based on the active power source and/or the total power requirement.

The process controller may be configured to provide feedback to a remote data distribution device regarding an amount of power to allocate and/or offer to the network apparatus. The VoIP phone may include a switch interfacing with the process controller, wherein the process controller is configured to provide feedback to a remote data distribution device regarding an amount of power to allocate and/or offer to the network apparatus. The process controller may be configured to selectively designate a Power over Ethernet (PoE) class signature for the VoIP phone. The process controller may selectively designate the PoE class signature based upon a user input or the total power requirement for the VoIP phone. The remote data distribution device may be a Gigabit Ethernet switch supplying power using Power over Ethernet (IEEE 801.3af) in any allowed configuration. The independent supply connection may be configured to connect to a battery, or a power supply which converts AC power into DC power.

One or more of the foregoing general aspects may provide one or more of the following advantages. For example, the PoE source may be prevented from being overburdened by too many devices drawing more current that the PoE supply can provide. The PoE source may be prevented from being overburdened when one or more devices malfunction and draw too much power. Alternatively, one or more of the foregoing aspects may prevent the PoE source from malfunctioning, and thus increase device and/or network system reliability. In addition, or alternatively, the user of a powered network device is provided with the ability to selectively control the power setting of the powered network device to adequately support the power consumption of the powered network device and/or any connected auxiliary devices. The powered network device provides the user with the ability to select power from a plurality of power sources to improve reliability and ease power consumption of PoE sources.

BRIEF DESCRIPTION OF THE DRAWINGS

Further aspects and advantages of the present invention will become apparent upon reading the following detailed description taken in conjunction with the accompanying drawings summarized below.

DETAILED DESCRIPTION

Embodiments consistent with the present invention are more specifically set forth in the following description with reference to the appended figures. Wherever possible, the same reference numbers will be used throughout the drawings to refer to the same or like parts.

Figure 1:
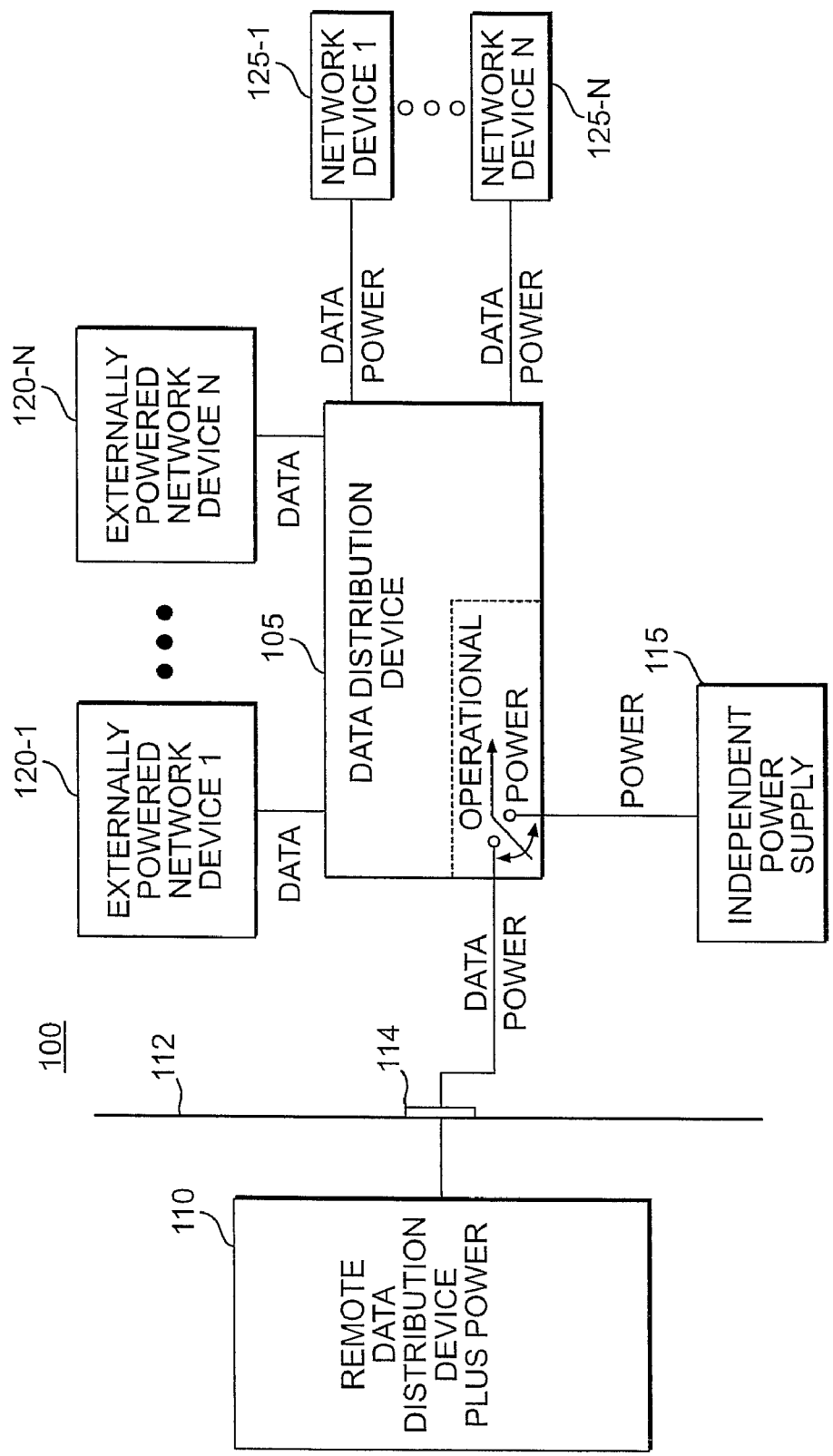
FIG. 1 shows an exemplary top-level block diagram of a data distribution device having alternate power supplies.

FIG. 1 shows an exemplary configuration 100 including a data distribution device having a plurality of power supplies. Configuration 100 may include a data distribution device 105, an independent power supply 115, a remote data distribution device 110, one or more network devices 125-1-125-N, and one or more externally powered network devices 120-1-120-N.

Data distribution device 105 may exchange data with remote data distribution device 110 over a connection through a wall plate 114. Wall plate 114 may be physically attached to wall 112, and may typically be in local proximity to data distribution device 105 and remote proximity from independent power supply 115. Additionally, operational power for the data distribution device 105 may be provided by remote data distribution device 110 over the same connection used for data through wall plate 114. Alternately, data distribution device 105 may select power over a dedicated power line connected to independent power supply 115. Data distribution device 105 may make this selection using an internal switch, the details of which are presented below. Data distribution device 105 may also exchange data with one or more externally powered network devices 120-1-120-N and with one or more network device 125-1-125-N. Typically, data distribution device 105 may not provide power to externally powered network devices 120-1-120-N. Data may be exchanged with other devices and/or networks through remote data distribution device 110, and/or may be exchanged with other devices directly connected to data distribution device 105. Additionally, data distribution device 105 may provide power to one or more network devices 125-1-125-N over the same connection used to exchange data, e.g., through an Ethernet connection and PoE. The power for the network device(s) 125-1-125-N originates from the power source that data distribution device 105 has selected. Moreover, data distribution device 105 may sense the amount of power required by one or more network devices 125-1-125-N, and provide power accordingly.

Data distribution device 105 may be any type of network device for distributing data using any physical networking standards and data communication protocols, including, for example, Ethernet and TCP/IP. Data Distribution device 105 may be a switch, a hub, a router, a patch panel, or any other type of network device configured to distribute data across the network. Data distribution device 105 may exchange data with remote data distribution device 110, externally powered network devices 120-1-120-N, and/or network devices 125-1-125-N using any known physical networking standards and data communication protocols, including, for example, Ethernet and/or TCP/IP. Data distribution device 105 may exchange data utilizing standard Ethernet cables and connectors, such as, for example, CAT5/5e, and/or CAT6 cabling, in conjunction with, for example, standard RJ-45 connectors. Data distribution device may operate at various data rates, e.g., 10/100/1000 Mbit/sec data rates, for data exchange, and thus, for example, may serve as a so called gigabit switch.

Data distribution device may select from one of a plurality of power supplies to supply its own internal power, and/or to supply power to one or more network devices 125-1-125-N. The switching of power supplies for the data distribution device may be performed using relays, transistors, or any other known switching devices. Details of one hardware switching approach are presented below in the description of FIG. 3. For sake of clarity, only two sources of power are illustrated in FIG. 1. As shown, data distribution device 105 may select power from independent power supply 115 or from remote data distribution device 110. The power selection may be based upon pre-defined logic rules within data distribution device 105, and can be based upon the source of incoming power and/or the maximum available power from each power source. For example, if only one source of power is present, then data distribution device 105 will utilize that source for internal power. If both remote data distribution device 110 and independent power supply 115 are supplying power, logic within data distribution device may switch to using power from independent power supply 115 to reduce the power draw from remote data distribution device 110, as it may be powering other devices over other Power over Ethernet (PoE) network connections (not shown). Alternatively, or in addition, a manual switch may be provided permitting the user the ability to manually select power supplies. This configuration may be particularly useful where the network device is an endpoint device, such as a VoIP phone with multiple power supplies and/or additional modular connections supporting various auxiliary devices, e.g., such as a USB port.

Additionally, or alternatively, data distribution device 105 may provide the appropriate feedback to remote data distribution device 110 as to how much power the data distribution device 110 needs to allocate and/or offer to data distribution device 105. This may be done, for example, using known IEEE 802.3af techniques by having data distribution device 105 present the appropriate resistive signature to remote data distribution device 110 based upon which power supply was selected. The resistive signature may be in accordance with signatures associated with any class prescribed by 802.3af, including, for example, Class 0, 1, 2, and/or 3 power signatures. Data distribution device 105 may obtain power from remote data distribution device 110 operating in any configuration, including midspan and endspan configurations, associated with PoE under IEEE 802.3af. Using the selected power supply, data distribution device 105 can subsequently provide power for network devices 125-1-125-N, if present.

Independent power supply 115 may supply power to data distribution device 105 using either standard or customized cabling and connectors. Remote data distribution device 110 may supply power using the same physical medium used to exchange data. Power may be delivered over the physical data connection media using any technique known to one of ordinary skill in the art. Such techniques include, for example, techniques and configurations which comply with the IEEE 802.3af Power over Ethernet (PoE) standards, or any other power over data line techniques know in the art.

Data distribution device 105 may in turn provide power to network devices 125-1-125-N over the same physical media used to exchange data, and may use IEEE 802.3af PoE standards, or any other power over data line techniques known in the art. In accordance with the 802.3af standard, data distribution device 105 may first sense how much power network devices 125-1-125-N require for proper operation, and allocate and/or offer power in accordance with the sensed requirements. Various techniques used to sense the power requirements may be utilized, particularly hardware circuitry defined according to IEEE 802.3af standards, and/or and may include Class 0, 1, 2, and/or 3 power signatures. Moreover, data distribution device 105 may provide a different power signature to remote distribution device 110 than data distribution device 105 receives from one or more network devices 125-1-125-N. Furthermore, the power signature which may be provided by the data distribution device 105 to the remote data distribution device 110 may not depend upon the value or presence of any other power signature request received by the data distribution device 105 from one or more network devices 125-1-125-N.

Remote data distribution device 110 may be any type of network device for distribution data (e.g., a switch, a hub, a router, and/or a patch panel, etc.) using any known physical networking standards and data communication protocols, including, for example, Ethernet and/or TCP/IP. Typically, remote data distribution device may be housed in a dedicated enclosure (such as, for example, a "closet"), and be used for a high speed communications (such as, for example, gigabit Ethernet), to serve as an interchange between upstream data communications with other networks and/or network devices (such as, for example, other local area networks, wide area networks, and/or the Internet, possibly through other external switches, routers, firewalls, patch panels, and/or hubs, etc., which are not shown in FIG. 1), and downstream data communication with plurality of downstream network devices (e.g., externally powered network devices 120-1-120-N and/or network devices 125-1-125-N) through data distribution device 105. Remote data distribution device 110 may have one or more dedicated power sources (not shown). Remote data distribution device 110 may have a main power source, such as a standard power source driven by AC wall power, or other standard power supplies known in the art. Remote data distribution device 110 may also include one or more backup power sources for redundancy or emergency purposes, such as for example, an uninterruptible power supply (UPS), which may include generator and/or battery backup, and/or any other type of backup known to those skilled in the art.

Remote data distribution device 110 may interface with other devices to deliver power utilizing the same physical connection media for which data is exchanged. For example, the physical connection media may be standard Ethernet cables and connectors (such as, for example, CAT5, CAT5e, and/or CAT6 cabling, using, for example, standard RJ-45 connectors). Power may be delivered over the physical connection media using any technique known to one of ordinary skill in the art. Such techniques include, for example, techniques and configurations which comply with the IEEE 802.3af Power over Ethernet (PoE) standards, which include sensing the power requirements of any downstream device requiring power (for example, data distribution device 105 and/or powered network devices 125-1-125-N) and allocating and/or offering power in accordance with the sensed requirements. Such requirements may be defined according to IEEE 802.3af standards, and may include Class 0, 1, 2, and/or 3 power signatures.

Independent power supply 115 may be any type of power supply known in the art, and can include, for example, AC/DC power converters (such as, for example, so called "wall warts"), DC/DC power converters, switching power supplies, battery power supplies, and/or capacitive power supplies, etc.). While only one independent power supply is shown, various embodiments of the invention could include more than one independent power supply. Independent power supply 115 may interface with data distribution device 105 using any method known in the art, including standard and/or custom power cables and connectors.

Network Devices 125-1-125-N may be any type of networkable device known in the art, using any known physical networking standards and data communication protocols, including, for example, Ethernet and TCP/IP. Network devices 125-1-125-N may exchange data using 10/100/1000 Mbit/sec rates using known cabling and connectors (such as, for example, CAT5, CAT5e, and/or CAT6 cabling, using, for example, standard RJ-45 connectors), and may receive operational power supplied by data distribution device 105 using the same cabling and connectors which are used for data exchange. Power may be supplied using any known methods, included IEEE 802.3af PoE. Network devices 125-1-125-N may include Voice over Internet Protocol (VoIP) telephones, analog phones equipped with ATA, soft phones, video cameras, still cameras, wireless access points, and/or remote telemetry data collection devices. Network devices 125-1-125-N may be powered through the connection to data distribution device 105 and/or through dedicated AC/DC wall adapters provided locally at one or more of the network devices 125-1-125-N.

Externally powered network devices 120-1-120-N may be any type of networkable device known in the art, using any known physical networking standards and data communication protocols, including, for example, Ethernet and TCP/IP. Network devices 125-1-125-N may exchange data using 10/100/1000 Mbit/sec rates using known cabling and connectors (such as, for example, CAT5, CAT5e, and/or CAT6 cabling, using, for example, standard RJ-45 connectors). Externally powered network devices 120-1-120-N may be arranged to only have power supplied to them through an external power supply which is not associated with data distribution device 105, e.g., power may not be directly supplied from data distribution device 105. Externally powered network devices 125-1-125-N may include personal computers, workstations, network devices with dedicated, independent power supplies, and/or laptops, routers, switches and/or hubs.

Figure 2A:
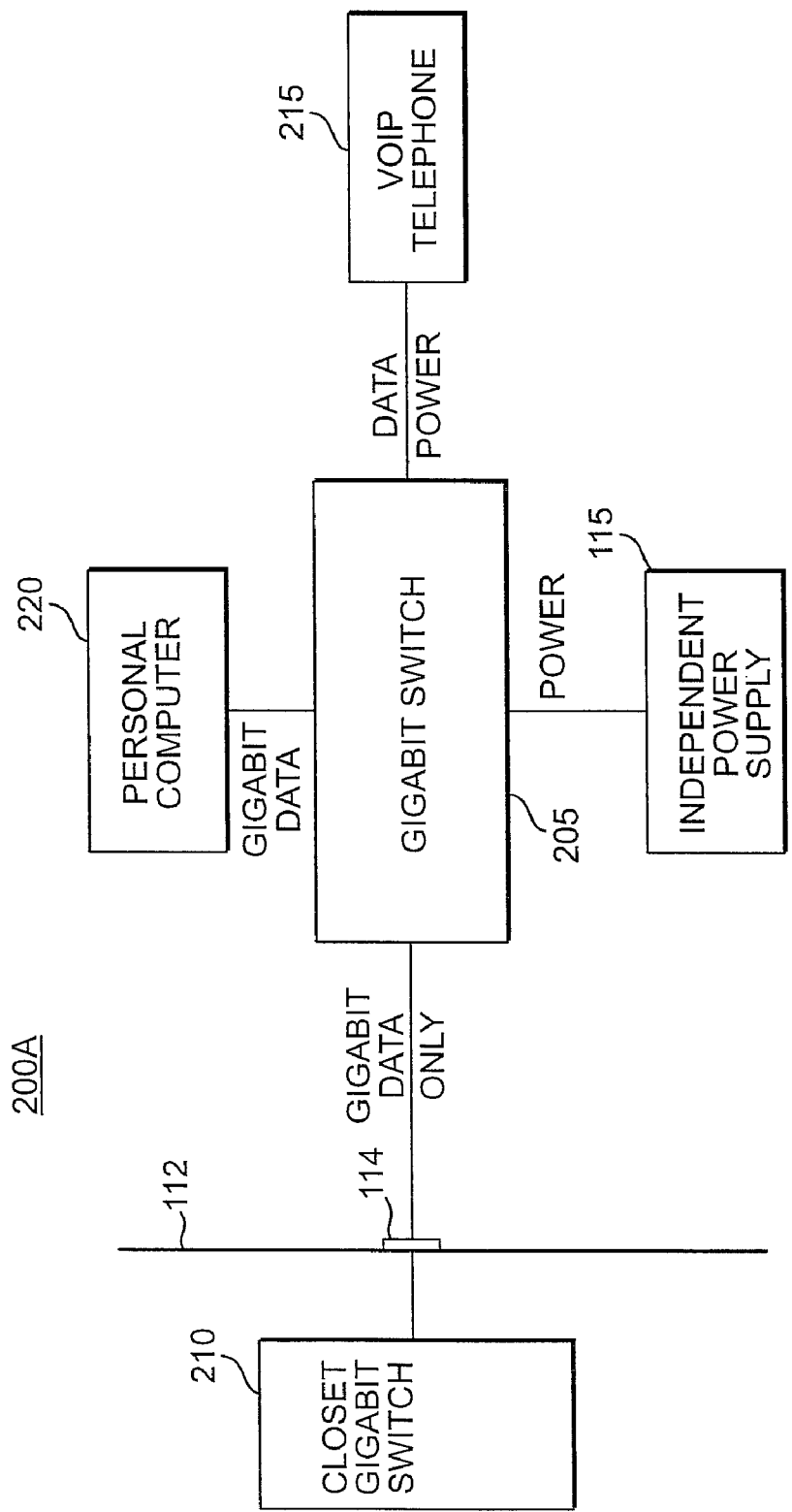
FIGS. 2A and 2B depict exemplary block diagrams of a gigabit Ethernet switch having selectable power supplies for use with VoIP telephones.

FIG. 2A depicts a gigabit Ethernet switch having selectable power supplies for use with VoIP telephones in a configuration 200A having an independent power supply. This configuration includes a closet gigabit switch 210, a Gigabit switch 205, an independent power supply 115, a personal computer 220, and a VoIP telephone 215. All of the data communications within this embodiment may utilize Ethernet and TCP/IP communication protocols.

In configuration 200A, gigabit switch 205 exchanges data over an Ethernet connection, through wall plate 114, with closet gigabit switch 210. Wall plate 114 may be mounted wall 112 which may be proximately located to gigabit switch 205, and distally located to closet gigabit switch 210. Closet gigabit switch 210 can serve a number of other connected devices throughout a network with data and power using IEEE 802.3af PoE (not shown). Gigabit switch 205 may further exchange data with personal computer 220, and with VoIP telephone 215. In one embodiment, gigabit switch 205 may exchange data with personal computer 220 and closet gigabit switch 210 at higher data rates, such as, for example, 1000 Mbps. Data exchanged between gigabit switch 205 and VoIP telephone 215 may occur at lower rates, such as, for example, 10/100 Mbps.

Since the independent power supply 115 is present in this configuration, gigabit switch 205 may sense power present at independent power supply 115 and select power from this source for use as operational power, and may not select PoE power from closet gigabit switch 210. Additionally, gigabit switch 205 may initially determine how much power VoIP telephone 215 requires using standard 802.3af sensing techniques, and subsequently supply power to VoIP telephone 215 using standard 802.3af PoE.

Figure 2B:
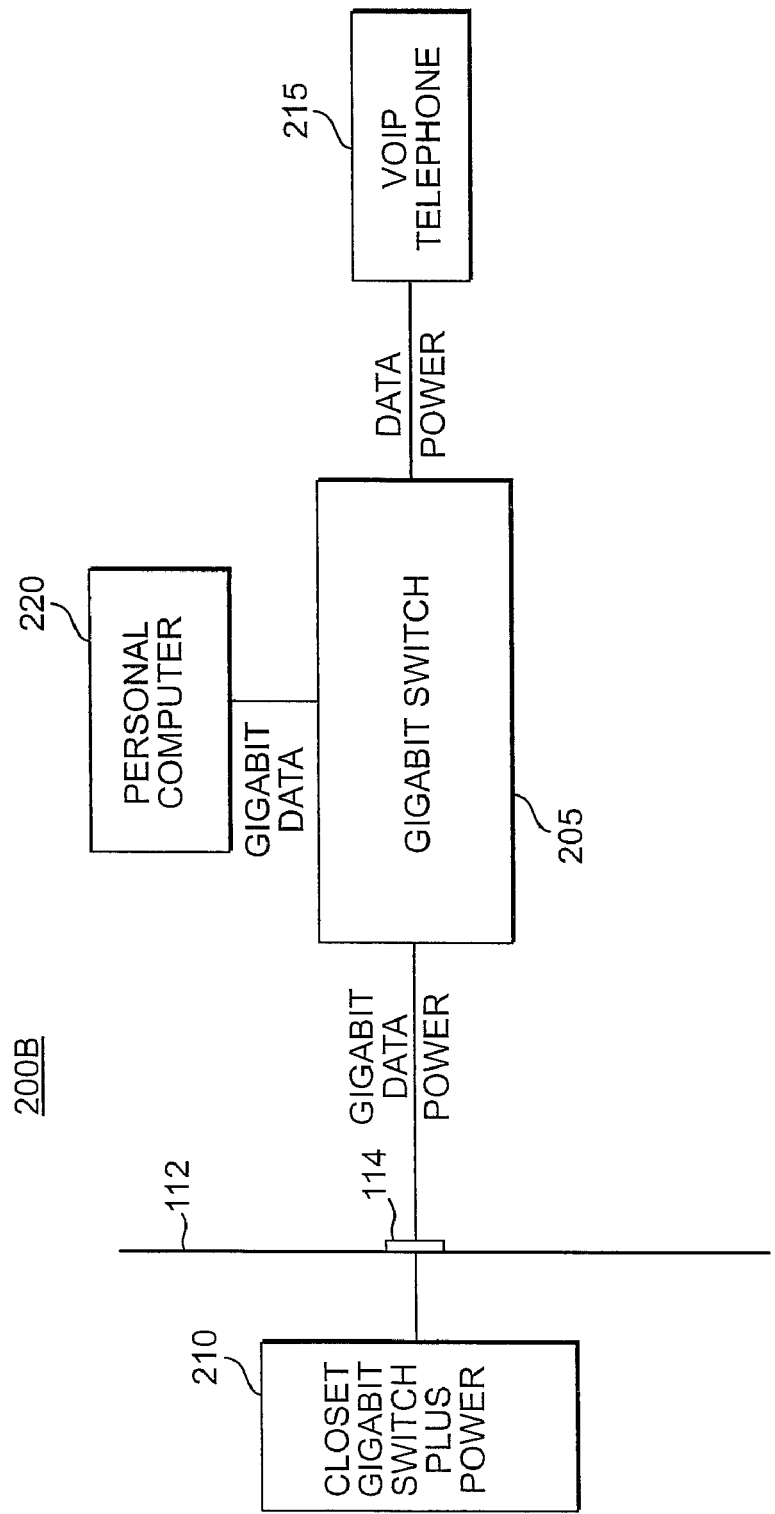

FIG. 2B depicts another configuration 200B of gigabit switch 205 which does not have an independent power supply connected thereto. Here, gigabit switch 205 would not sense power coming from the independent power supply, and would select power from closet gigabit switch 210. Upon initialization, closet gigabit switch 210 can determine how much operation power gigabit switch 210 requires utilizing 802.3af techniques, and allocate and supply the appropriate power amount over the same physical connection used for exchanging data. As described above, gigabit switch 205 can in-turn provide power to VoIP telephone 215 using 802.3af PoE as described above, although the power would be sourced from closet gigabit switch 210 in configuration 200B. As described above gigabit switch 205 may initially determine how much power VoIP telephone 215 requires using standard 802.3af sensing techniques, and subsequently supply the requested power thereto. The operation of gigabit switch 205 with respect to data communication would be the same as described above for configuration 200A shown in FIG. 2A. One of ordinary skill in the art would appreciated that configuration 200B may also support the configuration where independent power supply 115 is present, but for whatever reason(s), is not providing power to gigabit switch 205. In this case, power from closet gigabit switch 210 may serve as backup power for the independent power supply 115.

One practical advantage of configurations 200A and 200B is that they can permit high speed network communications with PC 220, while permitting the user to maintain the use of existing VoIP telephones which may have an internal switch operating at lower bit rates. This permits high speed communications for PC 220 through a relatively inexpensive upgrade by adding gigabit switch 205, while preserving the investment in the existing, slower speed VoIP telephone 215. In other words, this allows the user to upgrade PC 220, while avoiding having to upgrade to a relatively more expensive VoIP telephone having a high speed internal switch.

A practical advantage of gigabit switch 205 having the capability of selecting different power supplies is that it affords greater operational reliability to VoIP telephone 215. For example, independent power supply 115 may be utilized if closet gigabit switch 210 does not offer PoE, or in the event its PoE capabilities are overburdened by other connected devices. Also, independent power supply 115 may be provided as a battery backup by the user in the event closet gigabit switch 210 has a failure and cannot supply PoE.

Figure 3:
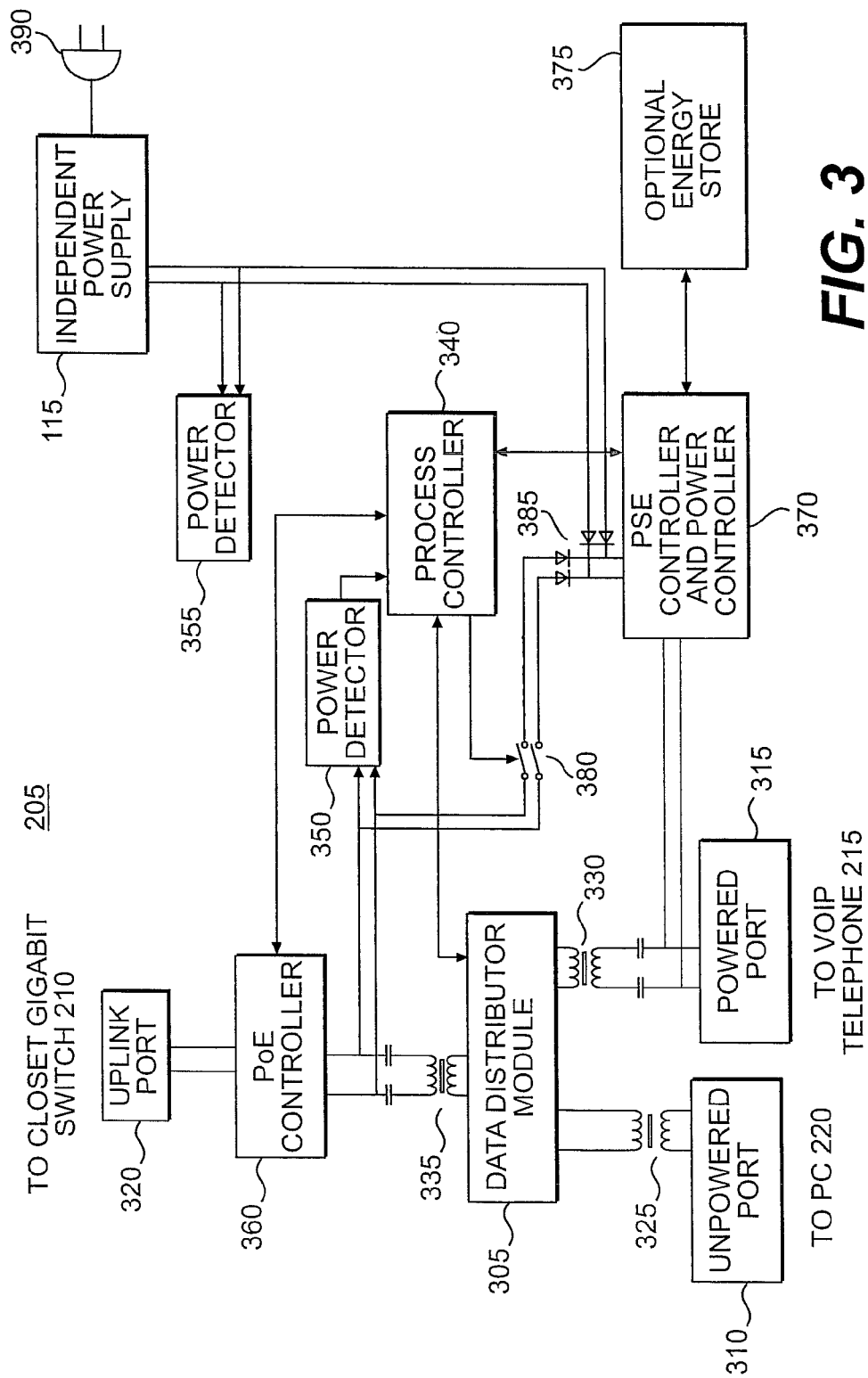
FIG. 3 shows an exemplary detailed block diagram of a data distribution device.

Referring to FIG. 3, an exemplary gigabit switch 205 may exchange data through uplink port 320, unpowered port 310, and powered port 315. These ports may be any type of data port known in the art, and can include, for example, RJ45 connectors. Data exchanged through uplink port 320 may originate from closet gigabit switch 210 and may operate at lower and higher data rates, such as, for example, 10/100/1000 Mbps. One of ordinary skill in the art would appreciate that closet gigabit switch 210 may be any type of data distribution device. Once presented at uplink port 320, data from closet switch 210 may pass through PoE controller 360 and then through an impedance matching circuit 335, and then onto data distributor module 305. Data exchanged through unpowered port 310 may originate from personal computer 220 which may also operate at lower and higher data rates, such as, for example, 10/100/1000 Mbps. One of ordinary skill in the art would appreciate that personal computer 220 may be any type of network based device. Once presented at uplink port 310, data from personal computer 220 may then pass through an impedance matching circuit 325 prior to being exchanged with data distributor module 305. Data exchanged through powered port 315 may originate from VoIP telephone 215 which may operate at lower data rates, such as for example, 10/100 Mbps. One of ordinary skill in the art would appreciate that VoIP telephone may also be any type of networked device. Once presented at powered port 315, data from VoIP telephone 215 may pass through an impedance matching circuit 330 and then onto data distributor module 305.

Data distributor module 305 may serve as an Ethernet switch which directs packets based upon their MAC addresses, various routing tables, and/or rules. Additionally, Data Distributor module 305 may also implement the features of a so called Multi-Layer Switch, and provide routing based on VLANs and the IP addresses themselves. A process controller 340 may provide one or more control signals to data distributor module for purposes of configuration and operating parameters, either at initialization time or during the course of normal operation of the system. Data distributor module 305 may take the form of an integrated circuit and be any type of data distributor module known in the art, including multi-port gigabit Ethernet switch controllers.

Process controller 340 may also receive signals from power detectors 350 and 355 which may indicate a source of power, and based upon these signals, process controller may select a power source through switch 380. Power detectors may be either voltage or current detectors, and may be of any appropriate type known to one of ordinary skill in the art. Over uplink port 320, power may be received using IEEE 802.3af PoE standards, which can be supplied by closet gigabit switch 210. If power is present at this port, power detector 350, which may connected to outputs coming from PoE controller 360, will sense the power signal from uplink port 320, and send a signal notifying process controller 340 that the closet gigabit switch 210 is providing a power signal. Similarly, power detector 355 may sense a power signal provided by independent power supply 115, which may be fed power through standard A/C wall socket over plug and connector 390. Power sensor 355 will then send a signal to process controller 340 that independent power supply 115 is providing a power signal which may be used for operational power. As discussed above, independent power supply could be any known power source, and additional independent power supplies may be utilized, along with additional power sensors, to accommodate additional power supply sources. Additional details of exemplary gigabit switches 205 and control logic are described in further detail in U.S. patent application Ser. No. 11/541,788, entitled APPARATUS AND METHODS FOR DATA DISTRIBUTION DEVICES HAVING SELECTABLE POWER SUPPLIES, filed on Oct. 3, 2006, the entirety of which is hereby incorporated by reference.

Process controller 340 may then exercise logic to determine which power supply to select through the gigabit switch 205. Such logic may be in the form of a program(s) stored in on-board memory (not shown) within the process controller. Process controller and memory may be of any type known to one of ordinary skill in the art. One form of logic which may be used could be to have process controller 340 use either PoE power from uplink port 320, or power from independent power supply 115, if only one of which is present. If both power sources are present, process controller 340 may select power from independent power supply 115 in order to minimize any aggregate PoE power draw, closet gigabit switch 210 may experience. Details of exemplary logic which may be used within the process controller 340 are further described in U.S. patent application Ser. No. 11/541,788.

Once process controller 340 determines which power supply to select, the selection may occur by process controller 340 sending a command signal to switch 380. Switch 380 may be a relay, one or more transistors, or any other type of switch which may be controlled by an electronic signal. Alternatively, or in addition, the network device may include a manual switch that may be provided to permit the user to manually control the power supply, e.g., further described with respect to an exemplary embodiment shown in and described in connection with FIGS. 4-7K. If process controller 340 selects independent power supply 115, it may open switch 380 so that current flows through a diode assembly 385 to a Power Sourcing Equipment (PSE) controller and Power Controller 370, hereinafter referred to as PCPC 370. If process controller 340 selects PoE power over uplink port 320, process controller 340 may close switch 380, and current from uplink port 320 will flow through diode assembly 385 into PCPC 370. Note that the voltage of independent power supply 115 may be chosen so, that if the independent power supply 115 is present and providing power, the appropriate diodes are back-biased, allowing current to flow from uplink port 320 into PCPC 370, and blocking current from independent power supply 115.

Process controller 340 may provide a signal to PoE controller 360 in order to provide feedback to closet gigabit switch 210 regarding how much power to allocate and supply to gigabit switch 205. PoE controller 360 may set up a signature resistance in accordance with IEEE 802.3af, to signal a class 0, 1, 2, and/or 3 power signatures. The signature resistance may be sensed by closet gigabit switch 210 during initialization so the appropriate amount of power is provided to gigabit switch 205. Moreover, close gigabit switch 210 may provide power in any configuration permitted under 802.3af, including, but not limited to endspan and/or midspan configurations. PoE controller 360 may take the form of an integrated circuit, or any other form known to one of ordinary skill in the art, such as integrated within a microprocessor within the network device. The PoE controller may signal the process controller various conditions, which may include normal status, overload, instability of voltage source, voltage sag and others. Additionally, the process controller may calculate the total power needed by Switch 205 and provide that information to the PoE Controller 360, so that the PoE Controller 360 may report that information back to the closet switch in accordance with IEEE 802.3af or any other appropriate standards.

Process controller 340 may also provide control signals to PCPC 370 which may include instructions for providing the appropriate amount of power to VoIP telephone 215. Initially, PCPC 370 may first sense the power VoIP telephone 215 is requesting by measuring the signature resistance presented at powered port 315 by VoIP telephone 215. This may be done in accordance with PoE standard 802.3af. Once the power signature is requested, which may be class 0, 1, 2, or 3, process controller 340 may instruct the power controller in PCPC 370 to provide powered port 315 with the appropriate amount of power for use by VoIP telephone 215. This power may be provided over powered port 315 using PoE. The PSE controller 370 may collect requested powering information from the device (215) connected to powered port 315 and report that information to Process Controller 340 for various purposes, including reporting back to the closet switch 210 via PoE Controller 360 for power of switch 205.

In addition to receiving power from either uplink port 320 via closet gigabit switch 210 or independent power supply 115, PCPC 370 may also receive initialization power from optional energy store 375. Optional energy store 375 provides initialization power to gigabit switch 250 for a short period of time so that it may perform the power supply selection. Since only a small amount of power needs to be provided for a short period of time (for example, on the order of milliseconds), optional energy source does not have to supply a large amount of energy, and can take the form of a battery, a capacitor, or any other appropriate storage device known in the art.

The gigabit switch 205 may use a variety of logic sequences when selecting the preferred power supply. For example, one logic sequence may assume that an administrator's overall power management strategy for a network is to minimize the power draw from closet gigabit switch 210, and have independent power supply 115 selected whenever its power signal is detected, so other devices connected to closet gigabit switch 210 may benefit from sourcing power utilizing PoE. One of ordinary skill in the art would appreciate other logic sequences may be performed to accomplish other power management strategies. One of ordinary skill in the art would also appreciate that, since a power supply has yet to be selected, the logic would be accomplished by the components in gigabit switch 205 using power supplied by optional energy store 375.

Initially, process controller 340 may scan each power detector 350 and 355 for an active power signal. Process controller 340 may then make the determination if power is present on power detector 355, which monitors power signals coming from independent power supply 115. If power is present on power detector 355, process controller 340 may source power from independent power supply 115. This can be accomplished by having process controller 340 send a signal to switching circuit 380 to open and prevent current from flowing from uplink port 320. Process controller 340 may then send another signal to PoE controller 360, which can set a signature resistance on uplink port 320 (in accordance with IEEE 802.3af standards) for signaling closet gigabit switch 210 that gigabit switch 205 does not require any power over the data line through uplink port 320. Alternatively, or additionally, power detector 350 may signal process controller 340 that power is present on uplink port 320, process controller 340 may send a signal to PoE controller 360 to configure the signature resistance across uplink port 320, so that it will signal closet gigabit switch 210 to allocate and offer power to gigabit switch 205 (S430).

The amount of power offered may depend on the value of the signature resistance value presented by PoE controller 360 (which may be based upon IEEE 802.3af standards). Process controller 340 may then source power from the closet gigabit switch 210 over uplink port 320. This may occur by having process controller 340 signal switching circuit 380 to close, thus allowing current to flow through diode arrangement 385. Independent power supply 115 may be configured so that the two diodes in series with its current supply will be back-biased when power is being supplied through uplink port 320, thus providing a way to economically and effectively block the power being supplied by independent power supply 115.

Figure 4:
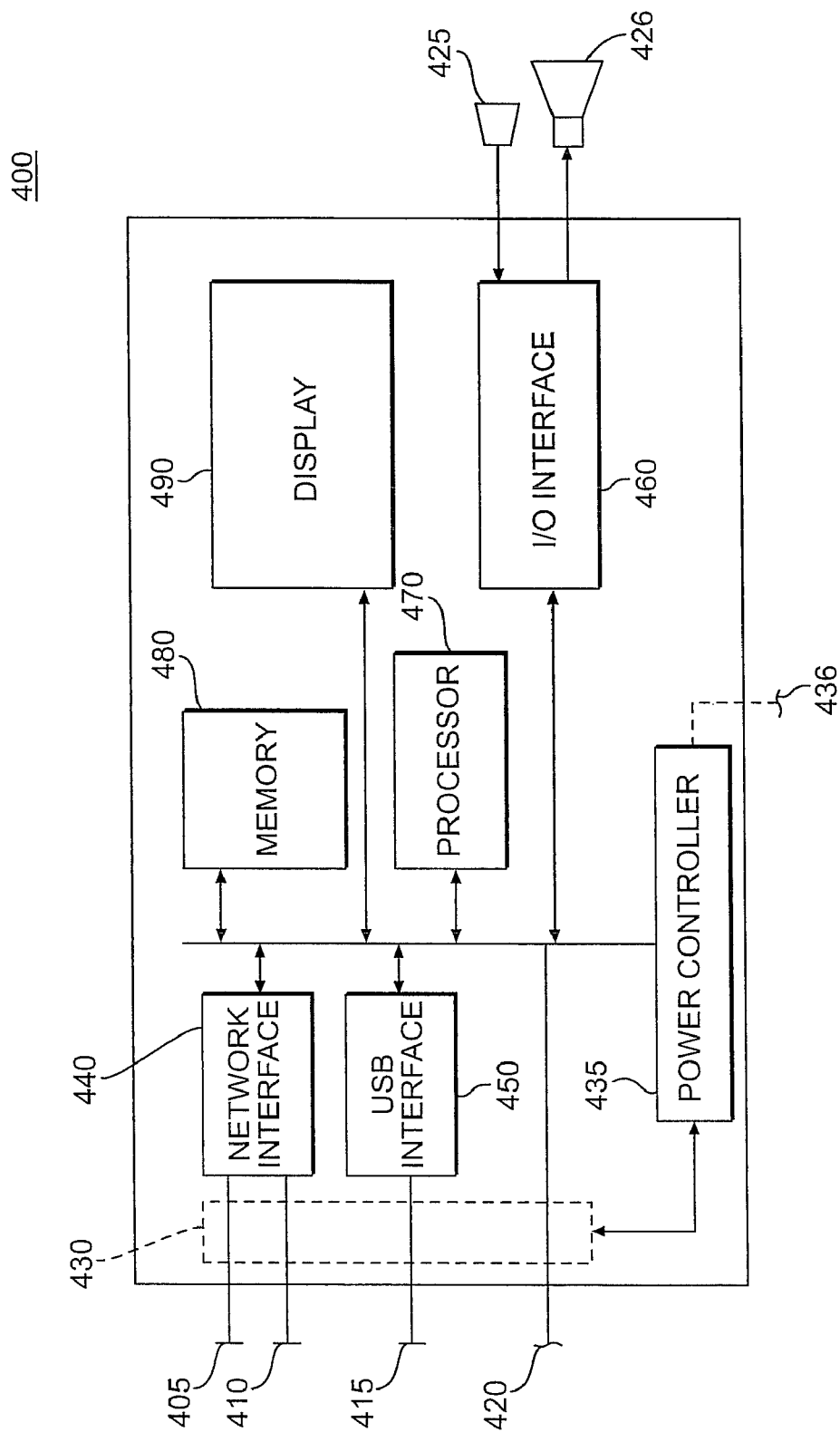
FIG. 4 is a schematic view of an exemplary network device configured to provide VoIP telephony.

Referring to FIG. 4, an exemplary network device 400, such as a VoIP telephone, includes a processor 470, a memory 480, a display 490, and an input/output interface 460. In addition, the VoIP phone 400 may include a network interface 440 for sending and receiving data over a network connection, e.g., such as a standard RJ-45 Ethernet connection. The processor 470 may include one or more processors for controlling, interpreting, and/or processing data exchanged between the VoIP telephone 400 and the network. The memory 480 may be one or more memory devices or media capable of storing data or instructions. Although the VoIP telephone 400 is depicted as including each of the components shown in FIG. 4, the VoIP phone may integrate one or more of the components shown in FIG. 4, such as through an integrated processing device or module, e.g., an analog telephony adapter (ATA) and/or combination of client software residing in memory 480. The ATA and/or client software may utilize audio codecs to handle data packet conversion, e.g., digital-to-analog conversion of incoming voice data. One or more VoIP protocols, such as, for example, H.323, may be used to define ways in which video, audio, and/or data is processed and/or transferred through the network using VoIP. The VoIP telephone 400 may also include a combination of hardware and software similar to that described in connection with FIG. 3 for detecting power and available power supplies.

The display 490 provides the user of the VoIP telephone 400 the ability to view call information, power management information, to review and/or conduct messaging (such as text or email messaging), and/or may serve as a user interface, e.g., such as a graphical user interface and/or touchscreen. The input/output interface 460 is shown as a monolithic device operably connected to a microphone 425 and a speaker 426, e.g., such as in a VoIP handset (not shown). However, the input/output interface 460 may include one or more individual and separate components, for example, such as an analog-to-digital converter for converting analog audio signals input through the microphone 425 to digital data, and/or a digital-to-analog converter for converting digital data to analog audio signals which is output through the speaker 426, such as through a VoIP handset.

The VoIP phone 400 may be used to make telephone calls over the internet through a standard network connection. Accordingly, the VoIP phone 400 includes one or more Ethernet connections 405, 410, e.g., such as RJ-45 Ethernet connectors. The Ethernet connections 405, 410 permit the phone 400 to exchange data and/or receive power, such as PoE, through a single connection, e.g., a twisted pair, CAT5e Ethernet cabling, and a modular connection. Alternatively, or additionally, the VoIP phone 400 may include an external power supply connection 420, for example, for connecting to an external wall outlet through an AC/DC or other wall adapter to provide an independent power supply for each networked client device. Alternatively, or in addition, the VoIP phone 400 may include similar software and/or hardware as that described with respect to gigabit switch 205 and shown in FIG. 3.

In addition, the VoIP phone 400 may include a USB port 415 and USB interface 450 for connecting a variety of peripheral devices, such as, for example, memory devices, cellular telephones, personal digital assistants (PDAs), and/or night lights. Although many peripheral devices connecting through the USB port 415 may be provided with independent or integrated power supplies, some peripheral devices may draw power through the VoIP phone 400, such as for charging the internal power supply of a PDA connected through the USB port 415. Peripheral devices drawing power through the USB port 415 may draw varying amounts of power, e.g., typically 2.5 W or less, through the VoIP phone 400 and the power source being used by the VoIP phone 400, e.g., through an AC/DC wall adapter if connected through connection 420 or through the Ethernet (PoE).

If the VoIP phone 400 is being powered in a PoE mode, power supply issues may arise for the VoIP phone 400 and/or the network to which the VoIP phone 400 is connected to and drawing power. For example, if a user plugs a peripheral device into the USB port 415, such as a PDA that recharges an internal battery while connected through the USB port 415, one or more power supply issues may arise if the VoIP phone 400 is receiving PoE. If the VoIP phone 400 is only receiving enough power from the PoE source to power the VoIP phone 400, the addition of peripheral devices can overload and/or damage the power supply of the PoE, overheat the network connections or cables, and/or cause unexpected drops in the voltage level of the PoE that may lead to software errors and/or resetting of one or more other networked devices, including the VoIP phone 400. Alternatively, the user may require faster data transfer rates through the VoIP phone 400, which may necessitate operating off of an independent power supply, e.g., so that all of the twisted pairs of the Ethernet connection are being utilized for data transfer and not data and PoE.

Accordingly, the VoIP phone may include one or more power detectors 430, a power controller 435 for executing software for detecting the power source and designating a power signature for the VoIP phone 400, and/or a PoE power signature switch 436 enabling the user and/or software to manually adjust the power signature, e.g., PoE power classification 0, 1, 2, 3 and/or 4. However, it will be appreciated that the power controller 435 and any other process controllers associated with various functions of the VoIP phone 400 may be accomplished by a microprocessor which integrates the various controllers within a single monolithic device, such as processor 470. The VoIP phone 400 may include one or more power detectors 430 for sensing the presence of power through one of the power sources, e.g., whether the VoIP phone 400 is receiving power through the AC/DC wall adapter connection 420 or through PoE. The power detector 430 may include a sensor or sensors for detecting the flow of current through each of the various power connections, e.g., a donut-shaped coil surrounding each conducting wire(s) or conducting pin passing through the coil.

If the VoIP phone 400 is receiving power through an independent power supply, such as through an AC/DC adapter connected to the connection 420, the power controller 430 may process software enabling the VoIP phone to also power peripheral devices through the USB port 415. Alternatively, or in addition, if the VoIP phone 400 is receiving power through PoE, the VoIP phone 400 may prompt the user to disconnect the USB port 415, connect an independent power supply through connection 420, and/or to adjust the power signature of the VoIP phone manually, e.g., move switch 436 positioned on the housing of the VoIP phone 400 to a higher power classification supporting peripheral devices, e.g., from a PoE class 2 signature to a PoE class 3 signature. Alternatively, or in addition, the VoIP phone 400 may automatically disable and/or adjust the power signature of the VoIP phone 400, e.g., through software residing within the phone and managed by the power controller 435.

In addition, or alternatively, the power detector 430 may include a sensor or sensors determining if a peripheral device connected through the USB port 415 is drawing power through the VoIP phone and USB interface 450. The power detector 430 may include sensors for each power source and/or for each USB port 415 provided on the VoIP phone 400. For example, if the VoIP phone 400 is provided with an Ethernet port 405, an AC/DC adapter connection 420 (or AC power connection with internal AC/DC transformer within the VoIP phone 400), and a pair of USB ports 415, the power detector 430 may include four independent sensors configured to detect current levels or power through the respective connections. Alternatively, the power detector 430 may include an integrated power detection module (as shown in FIG. 4) detecting current and/or power for each power source and device drawing power through the VoIP phone 400. Accordingly, one or more of the sensors may be configured to only detect current flow and/or actually measure current passing through the sensor, e.g., such as a donut-shaped coil surrounding the conducting wire and configured to detect and measure current passing through the conducting wire in a manner similar to a FLUKE™ clamp meter.

The power controller 435 determines the presence of current flowing within the powering wire of the USB port 415, e.g., to determine the active power source, and/or measures a total power or current draw for the VoIP phone 400 and any peripheral devices connected through the USB port 415, e.g., to determine the total power consumption for the VoIP phone 400. Alternatively, or in addition, the power controller 430 may determine the collective power draw of the VoIP phone 400, including any adapters, modules, and/or peripheral devices, each time the VoIP phone 400 is reset and/or each time an adapter, module, and/or peripheral device is connected or disconnected from the VoIP phone 400. The power controller 430 and/or processor 470 may monitor the USB port 415 and enable or disable the USB port 415 based upon actual real time power usage measurements at the USB port 415. Accordingly, the remainder of the network is protected from over current situations, such as when operating the VoIP phone 400 off of PoE.

Figure 5:
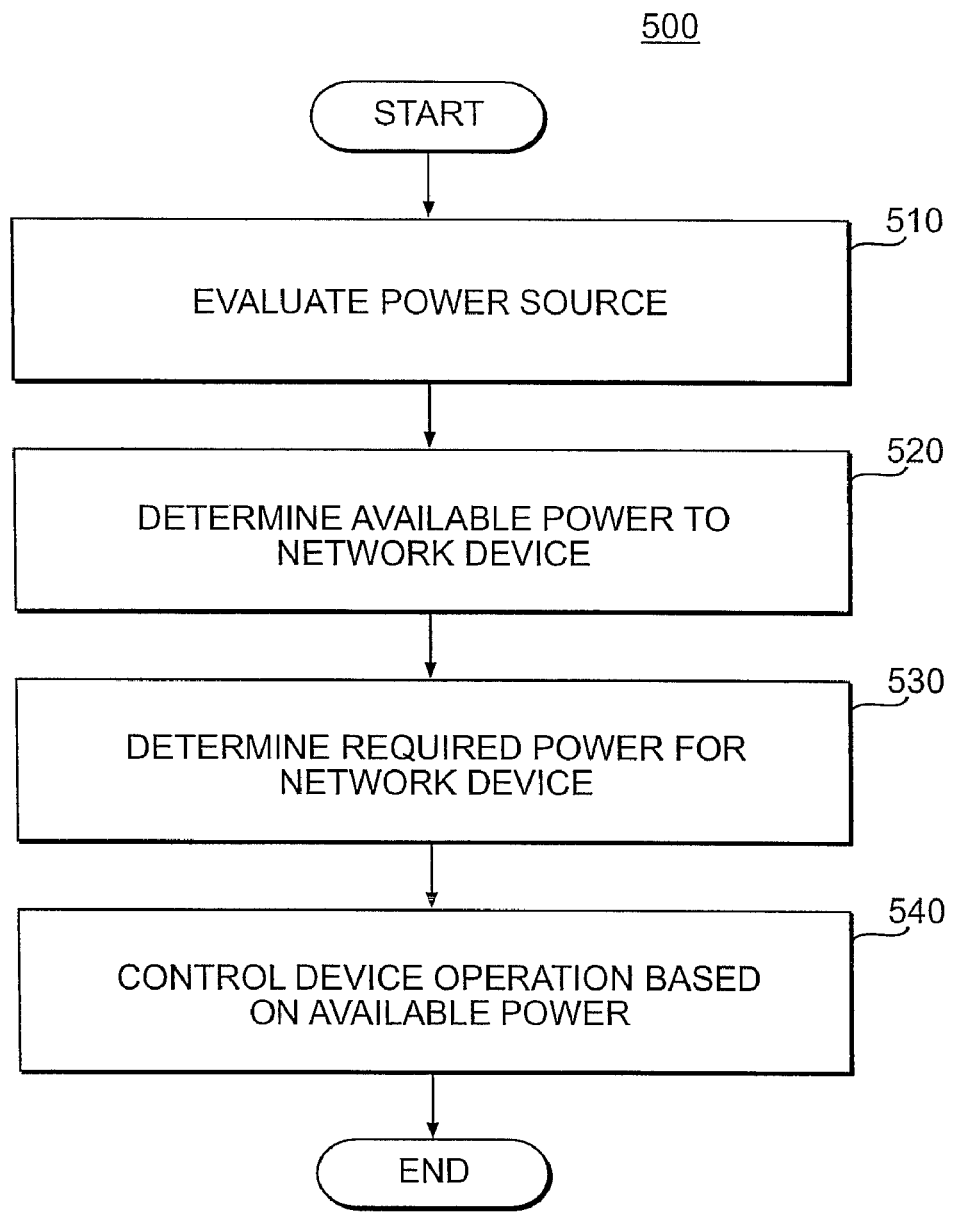
FIG. 5 is a flowchart of an exemplary process for controlling an operation of a network device based upon a power source for the network device.

Referring to FIG. 5, an exemplary power management process 500 for a network device, such as a VoIP phone 400, that may be initiated by the VoIP phone 400 each time a new peripheral device, adapter, and/or module is connected to the VoIP phone 400 and/or each time the VoIP phone 400 is restarted or initialized. The power management process 500 includes evaluating the potential power sources, e.g., the DC adapter connection 420 and/or the network connection(s) 405, 410, to identify an active power source (step 510). Depending upon the power source, e.g., PoE and/or independent power supply through the DC adapter connection 420, the total available power for the VoIP phone 400 is calculated by the power controller 435 (step 520). Next, the total required power for the VoIP phone 400 and any peripheral devices, adapters, and/or modules is determined with the power controller 435 (step 530). If the total required power is less than the total available power for the VoIP phone 400, the power management process 500 is terminated. If the total required power is more than the total available power for the VoIP phone 400, the VoIP phone 400 is either automatically limited in one or more operations or features (e.g., USB ports disabled or switched to lower power levels, and/or the user is prompted, such as through the display 490, to remove peripheral devices or take other measures that may reduce the total required power for the VoIP phone 400) (step 540). The power management process 500 is terminated upon adequately lowering the total required power of the VoIP phone 400 below the total available power, powering down the VoIP phone 400, and/or raising the total available power above that required by the VoIP phone, e.g., manually adjusting the power signature of the phone 400 with switch 436 to a higher power signature (from class 2 to class 3) and typically resetting the phone 400.

The evaluation of the active power source (step 510) may include the use of power detection sensor(s) 430 which determine if power is being provided through any one of network connections 405, 410, and/or through the independent power supply connection 420, e.g., through an AC/DC adapter. The power detection sensors 430 may simply detect the presence of a current and/or may also measure the flow of current to calculate the actual power being supplied and the actual power source, e.g., PoE or through an AC/DC adapter. The network device may be provided with hardware circuitry, such as the power controller 435, which designates the power signature of the VoIP phone 400 and all of the associated auxiliary devices. For example, if the switch 436 is manually set to a class 3 power setting, the network and the VoIP phone 400 may automatically designate the total power being provided as being a class 3 power source. Alternatively, or in addition, the VoIP phone 400 may be manually set, such as through a switch or graphical user interface to operate in a PoE mode or an AC/DC adapter (independent power supply) mode.

The total available power (step 520) may be determined by hardware circuitry within the VoIP phone, such as the power controller 435 within VoIP phone 400. For example, the VoIP phone 400 may include circuitry configured to calculate the actual power being supplied, e.g., through measurement of the current flowing from the power source with power detection sensors 430. The VoIP phone 400 may actually measure and calculate the available power or assign a default value to the available power supply based upon the detected power source. For example, if PoE is being supplied through the network connection 405, and a class 2 power signature has been set with switch 436, the total available power may be automatically set at a default setting of 6.49 Watts (maximum power level at the input of the powered network device).

When determining the required power for the VoIP phone 400, the power controller 435 may measure actual current flow or power draw for each auxiliary device, e.g., for each module, adapter, and/or peripheral device connected with the VoIP phone 400, e.g., with one or more power detection sensors 430. Alternatively, or in addition, the power controller 435 may assign default values, such as a maximum power consumption value for a device, to one or more auxiliary devices. For example, if the VoIP phone 400 is connected with an adapter or peripheral device, such as a USB device through USB port 415, the power controller 435 may automatically assign the maximum power consumption value for a USB device through the USB port 415 to a maximum value, e.g., 2.5 Watts. The determination of the total available power (step 520) and the determination of the total required power (step 530) may occur simultaneously, subsequently, and/or in reverse order from that shown in FIG. 5.

Although the foregoing description of a network device has been focused on the exemplary VoIP phone 400, the embodiments of the present invention are applicable to numerous network devices powered over a network data connection and/or having multiple power sources. For example, the network may include a personal computer, a wireless access point, a video camera, and/or a data collection device such as that described in connection with FIG. 3 which incorporates a power management process 500 permitting automatic switching between power supplies and/or manual selection of power supplies, e.g., by prompting a user to add/remove peripheral devices or power supplies.

A VoIP phone may include numerous network devices equipped to perform VoIP telephony. For example, a VoIP phone may include a "soft phone," e.g., a computer having an internet connection, speakers, microphone and a sound card. An analog telephony adapter (ATA) may be provided in conjunction with an analog phone to permit IP telephony over an existing phone and internet connection through a router or computer. The ATA includes an integrated analog-to-digital converter, and may also be integrated in a true VoIP phone, e.g., the phone connects into a router or other network connection using a modular adapter, such as an RJ-45 Ethernet connector. The ATA may include all of the hardware circuitry and software integrated into the VoIP phone so that no external adapters or modules are required to operate the VoIP phone.

In addition, or alternatively, any one of the steps shown in FIG. 5 may be performed in alternative orders depending on whether additional devices are being plugged or unplugged into the network device, whether the network device is being restarted or initialized, and/or based on various user inputs. For example, referring to FIG. 6, an exemplary power management process 600 for a powered network device includes numerous ways in which one or more operations of the powered network device (or associated auxiliary devices) may be controlled based upon the power consumption by or the power supply to the network device. In addition, FIGS.

Figure 6:
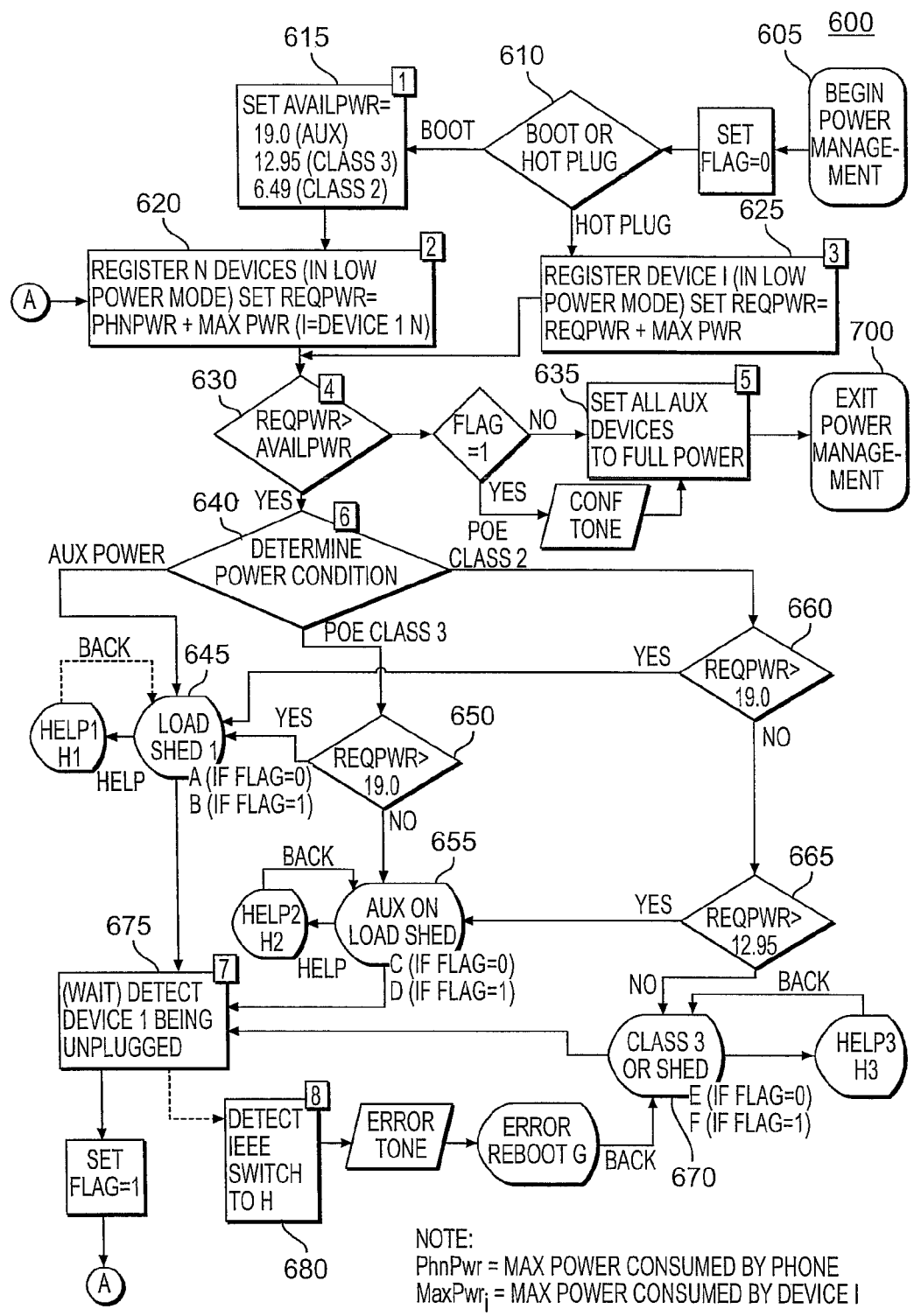
FIG. 6 is a flowchart of an exemplary process for managing power consumption of a network device.

7A-7K show exemplary screenshots of a display, such as display 490, on a network device configured to perform a power management sequence in accordance with the process shown in FIG. 6.

The power management process 600 covers the registration of newly added auxiliary devices (such as adapters, modules, or peripheral devices such as USB devices), the removal of auxiliary devices, and/or the associated user involvement with the power management process. In the following description of FIG. 6, a VoIP phone, such as that shown in FIG. 4, is used as an example of an network device supporting connection(s) to one or more auxiliary devices. However, various other network devices may be configured to implement one or more of the power management processes of this description.

If an auxiliary device is hot plugged into the VoIP phone, or added prior to a rebooting process for the VoIP phone, the auxiliary device is typically set to a low power mode drawing as little power as possible. However, if an adapter or module, such as a GigE adapter, does not require or support multiple power modes, the adapter or module may be preset to register at a high-power mode (or single power mode). For example, the individual auxiliary devices may have various power modes defined in the R/FS for the particular device. In addition, the various auxiliary devices may inform the VoIP phone of the maximum power requirements for the auxiliary device when the VoIP phone boots up and/or each time an auxiliary device is hot-plugged into the phone.

The power management process (600) is to be performed both when the phone is booting up as well as whenever a new auxiliary device is detected while the phone is in normal operation. Accordingly, the phone may be configured to perform an inquiry periodically, such as every 3-5 seconds, to determine if additional devices have been added or removed from the phone. For example, if a new device is detected while the phone is in the power management mode and waiting for a user response, the power management process (600) may be started over again from the beginning (step 605) to factor in the power demands of the new device. Accordingly, the amount of time required to recognize changes in the number or type of auxiliary devices being connected to the phone will be relatively short to permit the rapid recognition of new devices being added and/or the removal of devices, such as in response to a request from the phone to reduce power consumption.

Referring to FIG. 6, power management process (600) begins (step 605) upon phone initialization, e.g., such as during a system reboot or powering up of the phone or upon the detection of a newly added device while the phone is on (hot plug of auxiliary device). The power management process (600) may be performed by any combination of hardware circuitry and/or software resident within the network device. For example, the power controller 435 of phone 400 may determine whether the power management process is being initiated based upon the hot plugging of a new auxiliary device or upon phone initialization (step 610). In step 615, if the phone is being initialized, the available power is set to a power setting parameter characterizing the actual power source. For example, based on whether auxiliary power is used, e.g., through a DC adapter and connection 420, or power is provided over the Ethernet (PoE) (an IEEE switch, such as switch 436, is set to power signature 3 or 2, or "H" or "L," respectively), the parameter AvailPwr is set to 19.0 Watts (auxiliary power), 12.95 (class 3) or 6.49 (class 2), respectively. In step 620, the total required power for the phone and all auxiliary devices is calculated assuming full power values for each device. The number of devices being registered may be determined by a timer, such that after a predetermined period, e.g., 5 seconds, the power controller 435 will assume that all devices have completed the initial registration process and the total expected load can be calculated accurately. In step 625, if a new device is detected as being added to the phone, the incremental impact on total required power by the hot-plugged auxiliary device is added to the total required power. If more than one device is added at one time (as detected during the predetermined time interval) the impact of all such devices will be considered to determine the required power parameter, ReqPwr.

In step 630, the power controller 435 determines if AvailPwr is less than ReqPwr. If AvailPwr is less than ReqPwr, the auxiliary devices being added may be maintained in a low power state until the user takes the appropriate action to adjust AvailPwr and/or remove devices. Alternatively, the power controller 435 may disable the respective port, e.g., the USB port 415, of the auxiliary device entirely. Alternatively, or additionally, if the auxiliary devices have been previously registered and allowed to go to full power, the auxiliary devices may remain at full power during the subsequent power management process. If the required power is less than or equal to the AvailPwr, e.g., the available power is sufficient to power all devices, the auxiliary devices are permitted to go to a full power mode (step 635). In this case, the power management process 600 will terminate (step 700) until additional devices are removed, the power source is varied, and/or the phone is initialized.

In step 630, if the ReqPwr is greater than the AvailPwr, e.g., the phone requires more power than is available to the phone, the power management process 600 continues to determine the power source of the phone (step 640). In step 640, the power controller 435 determines the available power source, e.g., auxiliary power, PoE class 2 or 3, and initiates a variety of control options and/or user prompts depending on the appropriate remedial measure available. For example, various user prompts may be displayed on display screen 705 of display 490 to provide a user with Help and/or load shedding options (Help and/or load shedding user prompts shown in FIGS. 7A-7K).

In step 640, the appropriate power management screen to display for the user is based upon the available power source currently being used by the phone. For example, referring to FIGS. 7A-7K, numerous exemplary screenshots are shown that demonstrate various user prompts and power management options that may be displayed on the network device, e.g., such as on display 490 of VoIP phone 400. If the power requirement exceeds the maximum of the auxiliary power supply (19 Watts), an initial screen (FIG. 7A) may be shown, e.g., to prompt the user to remove a device. FIG. 7B may be shown if a device was removed by the user, e.g., a USB device is unplugged, but another device must be unplugged to meet the power requirements. If the power requirement exceeds the maximum of IEEE power class 3 (12.95 Watts), but less than the maximum of the aux power supply, an initial screen (FIG. 7C) may be shown prompting a change in power supply or device removal. If an auxiliary device has already been removed by the user in response to the initial screen (FIG. 7C), the user may be prompted to remove another device to meet the power requirements if still not met (FIG. 7D).

If the power requirement exceeds the maximum of IEEE power class 2 (6.49 Watts), but is less than Class 3 (12.95 Watts), an initial screen (FIG. 7E) may be shown prompting the user to change the power setting. If the user removes a device, but the power setting still needs to be changed, the user may be prompted to remove another device to meet the power requirements (or change power setting, FIG. 7F).

Figure 7A:
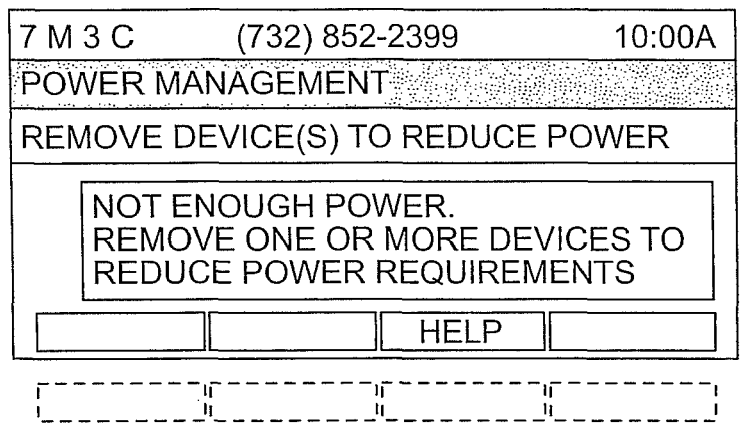
FIGS. 7A-7K are exemplary screenshots of a display on a network device configured to perform a power management sequence in accordance with the process shown in FIG. 6.
Figure 7B:
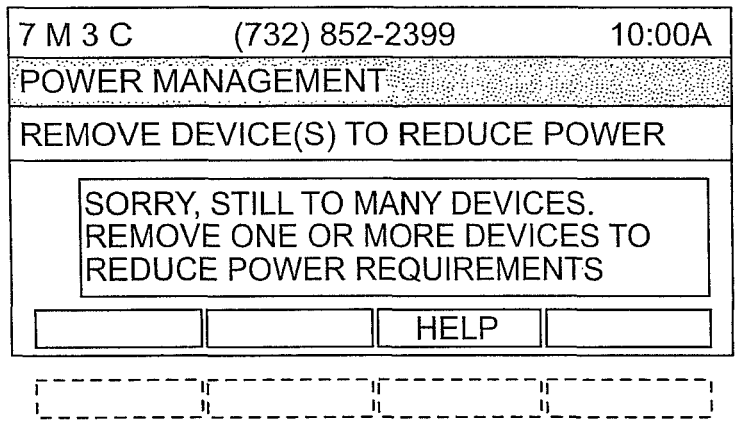
Figure 7C:
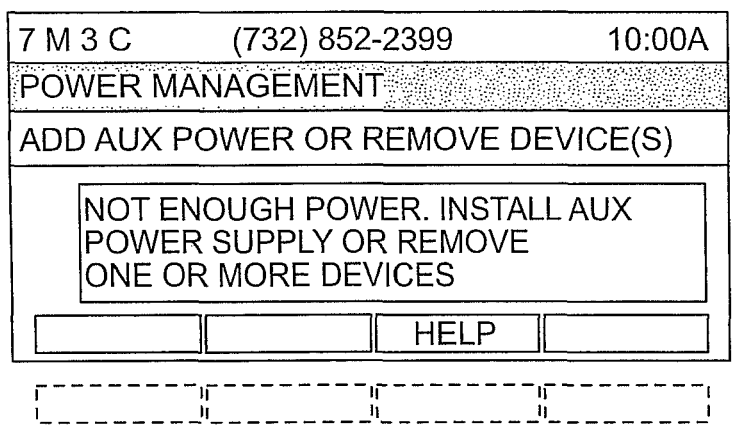
Figure 7D:
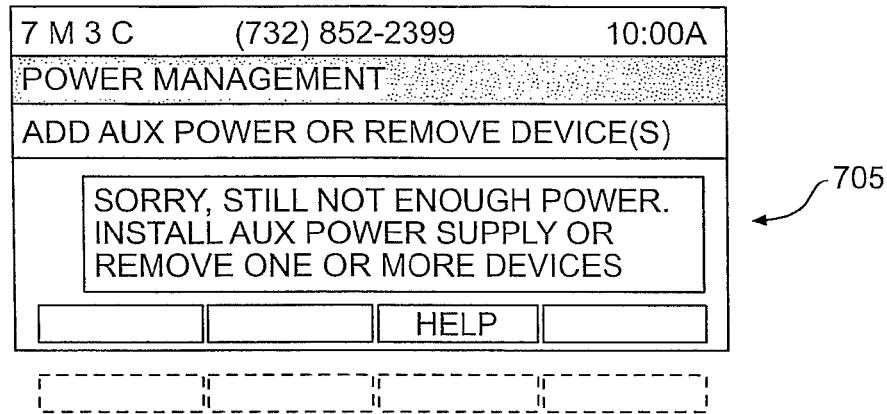
Figure 7E:
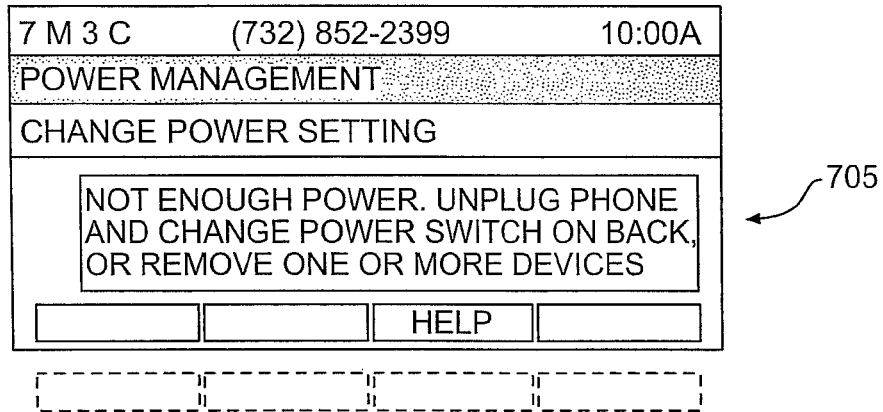
Figure 7F:
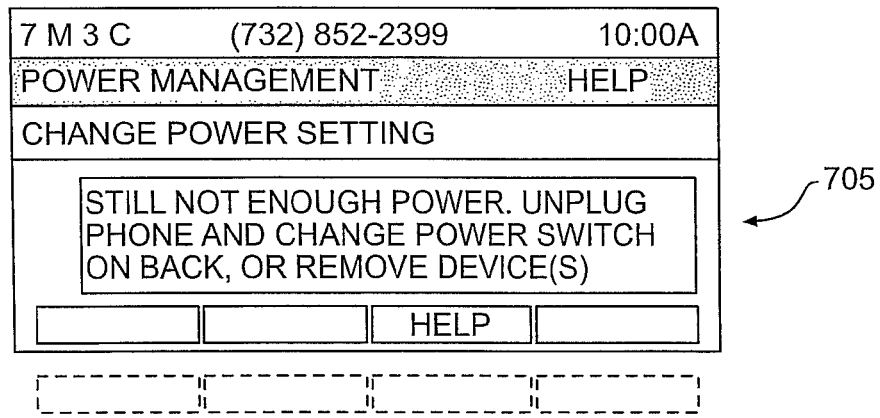
Figure 7G:
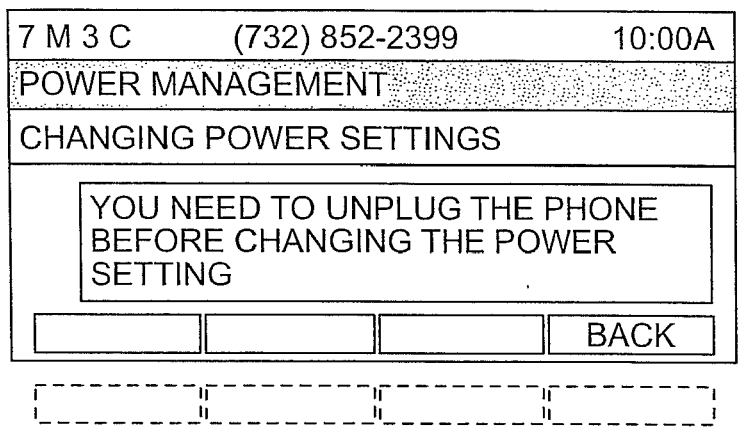
Figure 7H:
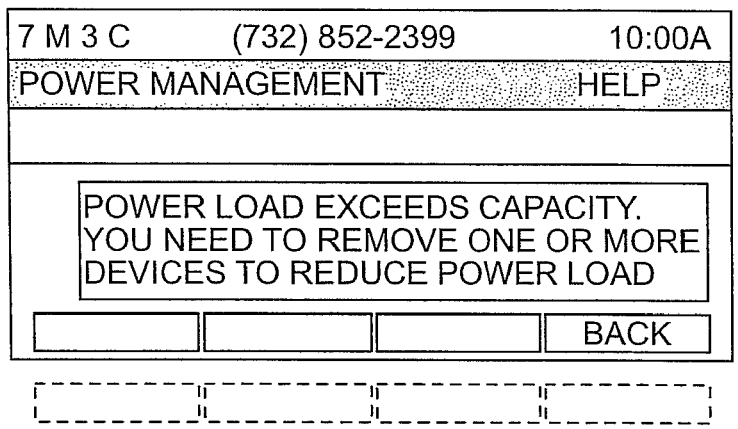
Figure 7I:
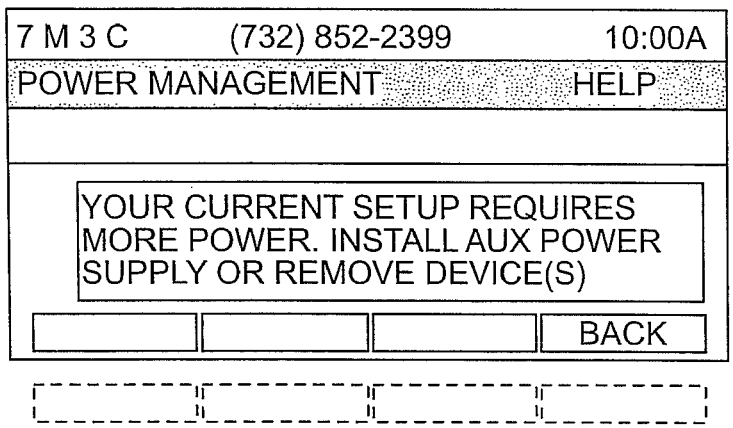
Figure 7J:
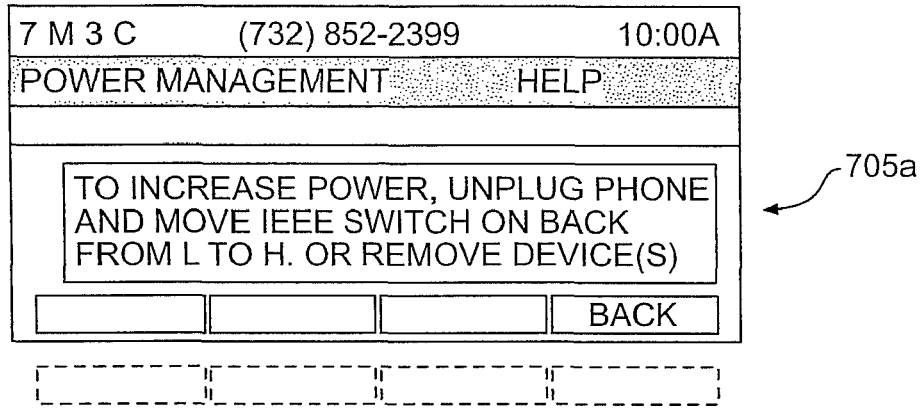
Figure 7K:
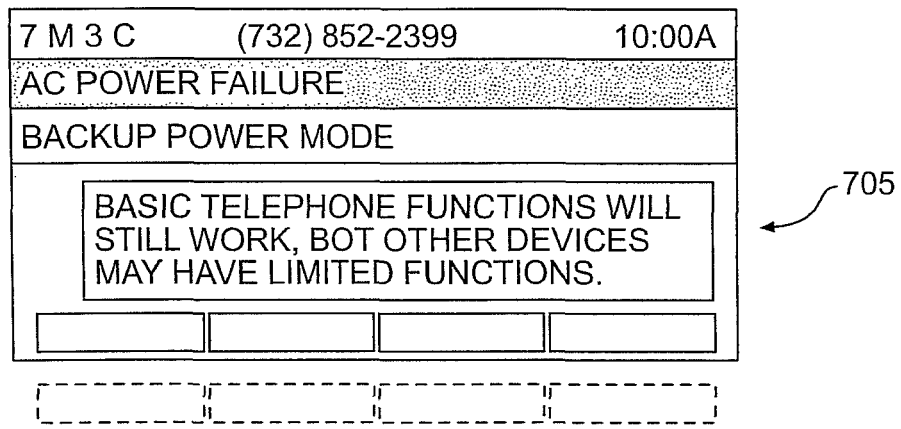

Referring to FIG. 7G, the user may be prompted to unplug the phone prior to changing the power setting, e.g., to permit the new power signature to be recognized by the system. For example, while waiting for either the phone to be unplugged or for a device to be detached, the IEEE switch may be changed from "L" to "H." The screen 705 of FIG. 7G is displayed to prompt the user to reboot the phone so that the change to PoE Class 3 can take effect.

The display screen 705 may include one or more features. As shown in FIGS. 7A-7G, the display screen includes user information, e.g., such as the VoIP phone address, date, and time, a description of the suggested remedial measure, and/or an additional description of the necessary action, e.g., if the user has not acted quickly enough and/or has not removed enough auxiliary devices to lower power requirements. In addition, the display screen(s) may include help screens with additional indications of the reason(s) why the power management action is provided to the user. For example, FIG. 7H (corresponding to FIGS. 7A and 7B), FIG. 7I (corresponding to FIGS. 7C and 7D), and FIG. 7J (corresponding to FIGS. 7E and 7F) are help screens 705a that may be selected by the user under a help option (Help) displayed on screens 705 shown in FIGS. 7A-7F, respectively.

Referring to FIGS. 7A-7B, if the phone is already operating under auxiliary power (19.0 Watts) with full power, the user may be prompted to shed load by removing devices (step 645). In step 650, if the power source is PoE class 3, the power controller 435 determines if the required power is greater than 19.0 Watts (auxiliary power). If the required power is greater than 19.0 Watts, the user is prompted to shed load (step 645). Referring to FIGS. 7B-7C, if the required power is not greater than 19.0 Watts (auxiliary power limit), the user is prompted to either shed load or switch to auxiliary power (step 655). In step 660, if the phone is being powered via PoE class 2 (6.49 Watts), the power controller 435 determines if the required power is greater than 19.0 Watts (auxiliary power). If the required power is greater than 19.0 Watts, the user is prompted to shed load by removing one or more auxiliary devices (step 645). In step 665, if the required power is not greater than 19.0 Watts, the power controller will then determine if the required power is greater than 12.95 Watts (class 3 PoE). If the required power is less than 12.95 Watts, the user may be prompted to either switch to class 3 PoE power (see FIGS. 7E-7F), auxiliary power (see FIGS. 7C-7D) and/or shed load (step 670, and FIGS. 7A-7B). If the required power is greater than 12.95 Watts, the user may be prompted to either shed load or switch to auxiliary power (step 655, FIGS. 7A-7D).

In step 675, the power controller 435 determines, e.g., after providing a predetermined time period for the user to take corrective action after being prompted visually and/or with an audio tone or signal, if one or more devices has been removed by the user. If the device has been removed, the routine may return to the beginning of the power management process (step 605) or loop back to an intermediate process step (e.g., step 620) to determine if the remedial measure (removal of the auxiliary device) addressed the power supply issue for the device. Alternatively, while the power management screen is displayed prompting the user to take some action, all auxiliary devices may be powered to a low power mode and/or disabled after some predetermined period of time. If the user action includes removing the auxiliary device from the phone, the power controller 435 of the phone will detect the user action and then repeat the power management process 600. Alternatively, or in addition, the user may unplug the phone to switch power sources, e.g., to either add aux power or to set the IEEE switch 436 to "H" (PoE class 3). When the phone reboots after being repowered, the Power Management process will restart from the beginning of the process (step 605). Further, if the power controller 435 detects the power source being changed, e.g., the IEEE switch 436 being changed from "L" to "H", an error tone may be played along with a screen prompting the user to reboot the phone and notify the system that the PoE signature for the phone has changed.

The power management process 600 may include one or more additional features. For example, the power controller 435 may be configured to scan the auxiliary devices periodically, e.g., every 3 seconds, to recognize each time an auxiliary device has been disconnected from the phone. In addition, the user may be provided with feedback, such as a screen indicating that remedial load shedding measures were successful or unsuccessful. Further, one of ordinary skill in the art will appreciate that the individual process steps described in connection with the exemplary power management process 600 of FIG. 6 may be performed simultaneously and/or in different orders. For example, as long as the user interface and power safeguards are ensured by the power management process 600, the determination of power condition may be provided before, during, or after the calculation of required power for the phone.

The power management process 600 may encounter network devices that do not have multiple power modes. For example, if a GigE adapter is connected to the network device, the network device may not use the existence of power through the modular connector, e.g., on pairs 7/8 of the CAT5e and RJ-45 connection, as a way to determine if auxiliary power is provided. Instead, as part of the initial registration procedure, the GigE adapter will inform the network device, e.g., the phone 400, as to whether power is being provided via Power over Ethernet (PoE) or auxiliary power. For example, if higher data exchange rates are being used between the GigE adapter and the phone 400, all of the pairs of the Ethernet connection may be required for data transfer and therefore PoE may not be available for the phone 400 through that connection.

Devices such as the GigE adapter will not have a low-power mode when first registering, and will likely only operate in full-power mode. Accordingly, the power management process may not be initiated if the GigE adapter first registers, as there will typically be sufficient power for the GigE adapter plus the phone 400. If a phone, such as an AVAYA Model No. 9630G or AVAYA Model No. 4600 equipped with a GigE adapter, is initially powered by an auxiliary power supply, but then transitions to PoE, e.g., in case of loss of AC power, the adapter may inform the phone of this transition to prompt the user to take remedial action and/or warn about potential effects in telephone function. For example, referring to FIG. 7K, the phone may check to see if the total power consumption (ReqPwr) is less than or equal to the Class 3 limit of 12.95 W. If the total power consumption is equal to or less than the Class 3 limit, no change in adapter configuration is required. However, if power requirements exceed 12.95 W, the phone may shed power load incrementally, and, after each load shedding step, the phone will re-calculate ReqPwr to determine if it is less than 12.95 W.

For example, load shedding may include the following remedial measures performed incrementally and in various orders. The USB interface, if enabled, may be disabled and 2.5 W subtracted from ReqPwr. If the phone is idle or in a non-alerting state, a handset charging cradle (such as a BLUETOOTH handset charging cradle if present) will be instructed to go to Low Power mode (and the difference between full power and low power subtracted from ReqPwr).

However, if the phone is active or alerting, this step may be skipped as the loss of power to the charging contacts may be interpreted as a desire to go off-hook on the BLUETOOTH handset if the phone is active or ringing. If the phone is not actively engaged in a BLUETOOTH call, the BLUETOOTH adapter (if present) will be instructed to go to Low Power mode (and the difference between full power and low power subtracted from ReqPwr). If the phone is actively engaged in a BLUETOOTH call, this step may be skipped. Various button modules, if provided, may be instructed to go to a Save Power mode (i.e., turn off the backlights). The difference between Full Power and Save Power will be subtracted from ReqPwr. The button modules, e.g., starting with the right most as viewed by the user, will be instructed to go to a Low Power mode (i.e., become inactive). The difference between Save Power and Low Power may then be subtracted from ReqPwr.

The phone may also notify the user of any of the above-described load-shedding actions by playing an error tone and displaying an interrupt screen (see FIG. 7K), e.g., that may be displayed for a predetermined period, such as 10 seconds, and then will revert to the previously displayed screen. However, call state changes that would normally call for a change to display information, or other higher priority interrupts may be designated as taking precedence over the interrupt screen and may terminate the display of this screen. If AC power is restored, all devices impacted by the loss of AC power will be restored to full power.

In addition, or alternatively, since the GigE adapter has the ability to be powered by both auxiliary power and PoE, auxiliary power may be used initially, but if AC power is disrupted, the GigE adapter may immediately fallback to PoE without re-booting. Accordingly, a phone with large power needs may be auxiliary powered, but in the event of AC power failure, to continue to operate from PoE.

The power management process may disable peripheral ports, such as the USB port. For example, the USB interface 450 may be available to provide power (up to 2.5 W), but only if auxiliary power (through AC/DC adapter connection 420) is being used to power the phone. Although the USB device may not actually report its actual power draw, the phone may be configured to assume that 2.5 W is to be allocated to the USB port if being used and detected during registration. If the USB port is not being used, the power controller 435 will know this and not include this as part of the total power draw for the phone.

For example, the network device may include connections for one or more peripheral devices through numerous network connections, such as RJ-45 or RJ-11 modular connectors, and/or various types of data communication cable, e.g., fiber optic, twisted pair, and/or coaxial cable. The peripheral devices, modules, and/or adapters may include devices connected through a USB port, modular connector, or other standard networking connection. The power management process may detect the presence of one or more auxiliary devices and directly measure power demands and/or estimate the power demands for the auxiliary devices based on known minimum, average, or maximum power loads for the auxiliary device.

The switch 436 on the VoIP phone 400 provides the user with the ability to change the "power signature" that the phone presents to the Ethernet switch that provides PoE. The IEEE 802.3af standard allows for distinct power consumption levels, numbered 0 thru 3, with 3 being the highest consumption. The phone may therefore be equipped with hardware circuitry in accordance with the IEEE 802.3af standard to indicate which of the power levels is required. In a stand-alone mode, e.g., no adapters, the phones may fall into Class 2 power consumption. However, with the addition of adapters, etc. the phone may move into Class 3 power requirements. The power switch may then be used to switch in the hardware circuit to present a Class 3 signature to the Ethernet switch, such as gigabit switch 205.

The use of a manual or electronic switch and/or power management process permits the network device, e.g., a VoIP phone, to use multiple PoE signatures. If the network device presented a Class 3 signature to the network at all times, the Ethernet switch would then have to reserve sufficient power to allow all phones to use the full complement of Class 3 power, e.g., even if only a small number of the VoIP phones actually had any adapters attached to them. By providing the ability to optimize the power class signatures, the Ethernet switches, power supplies and other related network hardware may be reduced in size and cost, and utilized more efficiently. The aforementioned network devices, e.g., such as a VoIP phone or other PoE-powered device, are thus provided with the ability to change their power signature and/or automatically and accurately manage power through various combinations of monitoring of total potential power consumption, user feedback, and multiple power supplies.

The power management of multiple network devices, e.g., the Ethernet switch of FIG. 3 and the VoIP phone 400 of FIG. 4, may be managed in an integrated system which collectively monitors power requirements for all endpoint devices connected in a data network. For example, the power controller 430 within the phone 400 may determine that PoE is sufficient to power the phone 400 and any connected peripheral devices, but the Ethernet switch may not be able to provide PoE. In this case, a power management routine executed at a common data distribution device may collectively control available power supplies for several powered network devices, e.g., connected through a common router, hub, or switch.

Although detailed embodiments and implementations have been described above, it should be apparent that various modifications are possible without departing from the spirit and scope of the present invention.

What is claimed is:

1. A method for managing power supplied to a network device, comprising:
   scanning a plurality of power inputs to the network device to ascertain if a power signal is present and to identify an active power source;
   determining available power from the active power source;
   determining required power for the network device and any operatively connected auxiliary devices;
   comparing required power to available power to determine if available power is sufficient to power the network device; and
   controlling an operation of the network device based upon the active power source and/or if available power is insufficient to power the network device,
   wherein controlling the operation of the network device comprises switching the active power source to an alternative power source.

2. A method for managing power supplied to a network device, comprising:
   scanning a plurality of power inputs to the network device to ascertain if a power signal is present and to identify an active power source;
   determining available power from the active power source;
   determining required power for the network device and any operatively connected auxiliary devices;
   comparing required power to available power to determine if available power is sufficient to power the network device; and controlling an operation of the network device based upon the active power source and/or if available power is insufficient to power the network device,
wherein controlling the operation of the network device comprises prompting a user to remove a connected auxiliary device to lower required power.

3. The method of claim 1, wherein controlling the operation of the network device comprises prompting a user to source power from a different power source if required power is greater than available power.

4. The method of claim 1, wherein controlling the operation of the network device comprises limiting a power supply from the network device to one or more auxiliary devices operatively connected to the network device.

5. The method of claim 1, wherein the active power source is a Power over Ethernet (PoE) power source.

6. The method of claim 5, wherein the alternative power source is a Power over Ethernet (PoE) power source with an IEEE class different from the active power source.

7. The method of claim 1, wherein the alternative power source is an auxiliary power source provided by a battery or a power supply which converts AC power into DC power.

8. The method of claim 5, wherein the alternative power source is an auxiliary power source provided by a battery or a power supply which converts AC power into DC power.

9. The method of claim 1, wherein the alternative power source is a switch which provides power in conjunction with a data signal.

10. The method of claim 1, wherein controlling the operation of the network device comprises limiting a power supply from the network device to a USB port of the network device if available power is insufficient to provide required power.

11. The method of claim 1, wherein determining required power for the network device is based on a PoE class signature for the network device.

12. The method of claim 1, wherein determining required power for the network device comprises assigning a predetermined power requirement for any operatively connected auxiliary devices.

13. The method of claim 1, wherein determining required power for the network device comprises measuring a power requirement for any operatively connected auxiliary devices.

14. A computer-readable medium having computer-executable instructions contained therein for performing a power management method for a network device, the method comprising:
scanning a plurality of power inputs to the network device, to ascertain if a power signal is present and to identify an active power source;
determining available power from the active power source;
determining required power for the network device and any operatively connected auxiliary devices;
comparing required power to available power to determine if available power is sufficient to power the network device; and
controlling an operation of the network device based upon the active power source and/or if available power is insufficient to power the network device,
wherein controlling the operation of the network device comprises switching the active power source to an alternative power source or prompting a user to remove a connected auxiliary device to lower required power.

15. A network apparatus having access to multiple power sources, the network apparatus comprising:
at least one sensor operatively coupled to a plurality of power inputs;
an auxiliary device connection; and
a process controller configured to:
scan the power inputs to ascertain if a power signal is present and to identify an active power source;
determine available power from the active power source;
determine required power for the network device and any operatively connected auxiliary devices;
compare required power to available power to determine if available power is sufficient to power the network device; and
control an operation of the network device based upon the active power source and/or if available power is insufficient to power the network device by switching the active power source to an alternative power source or prompting a user to remove a connected auxiliary device to lower required power.

16. A network apparatus, comprising:
a power detection device configured to sense a first power signal from an independent power supply and to sense a second power signal through a network connection, wherein the network connection supports both data exchange with, and power supply to, the network apparatus; and
a process controller configured to determine an active power source based on either the first power signal or the second power signal, and to control an operation of an auxiliary device operatively connected to the network apparatus based upon the active power source,
wherein the network apparatus is a Voice over Internet Protocol (VoIP) telephone, a camera, a wireless access point, and/or a remote telemetry data collection device.

17. The network apparatus according to claim 16, wherein the process controller is configured to control a supply of power to the auxiliary device operatively connected to the network apparatus and based upon the active power source.

18. The network apparatus according to claim 17, wherein the process controller is configured to determine if total available power for the network apparatus from the active power source is greater than or equal to total required power for the network apparatus and the auxiliary device.

19. The network apparatus according to claim 18, wherein the process controller is configured to limit the supply of power to the auxiliary device if total available power is less than total required power.

20. The network apparatus according to claim 17, further comprising a USB port, wherein the process controller is configured to control the supply of power to the auxiliary device through the USB port.

21. The network apparatus according to claim 17, further comprising an auxiliary device connection, wherein the auxiliary device is a network module, a network adapter, or a peripheral device, operatively connected and capable of receiving power through the auxiliary device connection.

22. The network apparatus according to claim 21, wherein the power detection device is configured to sense a power signal between the network apparatus and the auxiliary device operatively connected through the auxiliary device connection.

23. The network apparatus according to claim 22, wherein the power detection device is configured to determine a power requirement for the auxiliary device based on the power signal between the network apparatus and the auxiliary device, and the process controller is configured to determine the total required power for the network apparatus based on the power requirement for the auxiliary device.

24. The network apparatus according to claim 16, wherein the network apparatus is a Voice over Internet Protocol (VoIP) phone.

25. The network apparatus according to claim 16, wherein the network apparatus is a powered network device configured to receive Power over Ethernet (PoE) through the network connection.

26. The network apparatus according to claim 16, wherein the network apparatus is configured to be powered in a Power over Ethernet (PoE) configuration, including endspan and midspan configurations, and provides a PoE power signature to a remote data distribution device.

27. The network apparatus according to claim 16, wherein the process controller is configured to provide a power signature for the network device to an endspan or midspan remote data distribution device, the power signature being selectable by the user of the network apparatus.

28. A Voice over Internet Protocol (VoIP) telephone, comprising:
   an independent power supply connection configured to provide a first power signal;
   a network connection, wherein the VoIP telephone exchanges data with, and receives a second power signal through the network connection;
   an auxiliary device connection;
   a power detection device configured to sense the first power signal from the independent power supply connection, to sense the second power signal through the network connection, and to sense an auxiliary device operatively connected through the auxiliary device connection; and
   a process controller configured to determine an active power source based on sensing either the first power signal or the second power signal, to determine a total power requirement for the VoIP telephone, and to control an operation of the VoIP telephone based upon the active power source and the total power requirement.

29. The Voice over Internet Protocol (VoIP) telephone according to claim 28, wherein the process controller is configured to control a supply of power to the auxiliary device based on the active power source.

30. The Voice over Internet Protocol (VoIP) telephone according to claim 28, wherein the power detection device is configured to sense a power signal between the network apparatus and the auxiliary device operatively connected through the auxiliary device connection.

31. The Voice over Internet Protocol (VoIP) telephone according to claim 28, wherein the power detection device is configured to determine a power requirement for the auxiliary device based on the power signal between the network apparatus and the auxiliary device, and the process controller is configured to determine the total power requirement for the network apparatus based on the power requirement for the auxiliary device.

32. The Voice over Internet Protocol (VoIP) telephone according to claim 28, wherein the auxiliary device connection is a USB port, and the process controller is configured to control a power supply to the USB port based on the active power source and/or the total power requirement.

33. The Voice over Internet Protocol (VoIP) telephone according to claim 28, wherein the process controller is configured to provide feedback to a remote data distribution device regarding an amount of power to allocate and/or offer to the network apparatus.

34. The Voice over Internet Protocol (VoIP) telephone according to claim 28, further comprising a switch interfacing with the process controller, wherein the process controller is configured to provide feedback to a remote data distribution device regarding an amount of power to allocate and/or offer to the network apparatus.

35. The Voice over Internet Protocol (VoIP) telephone according to claim 28, wherein the process controller is configured to selectively designate a Power over Ethernet (PoE) class signature for the VoIP phone.

36. The Voice over Internet Protocol (VoIP) telephone to claim 35, wherein the process controller selectively designates the PoE class signature based upon a user input or the total power requirement for the VoIP phone.

37. The Voice over Internet Protocol (VoIP) telephone according to claim 34, wherein the remote data distribution device is a Gigabit Ethernet switch supplying power using Power over Ethernet (IEEE 801.3af) in any allowed configuration.

38. The Voice over Internet Protocol (VoIP) telephone according to claim 28, wherein the independent supply connection is configured to connect to a battery, or a power supply which converts AC power into DC power.

* * * * *